Oct. 29, 1957 R. C. FERRARO 2,811,307

FULL KEY BOARD LISTING-ADDING MACHINES

Filed Aug. 31, 1954 18 Sheets-Sheet 1

RAUL CARLOS FERRARO

*INVENTOR.*

BY Ivan P. Tashof

Attorney

RAUL CARLOS FERRARO

INVENTOR.

BY Ivan P. Tashof
Attorney

Oct. 29, 1957 R. C. FERRARO 2,811,307

FULL KEY BOARD LISTING-ADDING MACHINES

Filed Aug. 31, 1954 18 Sheets-Sheet 3

RAUL CARLOS FERRARO

INVENTOR.

BY Ivan P. Tashof

Attorney

RAUL CARLOS FERRARO

INVENTOR.

BY Ivan P. Tashof

Attorney

Oct. 29, 1957 R. C. FERRARO 2,811,307

FULL KEY BOARD LISTING-ADDING MACHINES

Filed Aug. 31, 1954 18 Sheets-Sheet 5

RAUL CARLOS FERRARO

INVENTOR.

BY Ivan P. Tashof

Attorney

FULL KEY BOARD LISTING-ADDING MACHINES

RAUL CARLOS FERRARO
INVENTOR.
BY Ivan P. Tashof
Attorney

RAUL CARLOS FERRARO
INVENTOR.
BY Ivan P. Tashof
Attorney

Oct. 29, 1957 R. C. FERRARO 2,811,307

FULL KEY BOARD LISTING-ADDING MACHINES

Filed Aug. 31, 1954 18 Sheets-Sheet 8

RAUL CARLOS FERRARO

INVENTOR.

BY Ivan P. Tashof

Attorney

FULL KEY BOARD LISTING-ADDING MACHINES

Filed Aug. 31, 1954 18 Sheets-Sheet 9

RAUL CARLOS FERRARO

INVENTOR.

BY Ivan P. Tashof

Attorney

FULL KEY BOARD LISTING-ADDING MACHINES

Filed Aug. 31, 1954 18 Sheets-Sheet 10

RAUL CARLOS FERRARO

INVENTOR.

BY Ivan P. Tashof
Attorney

RAUL CARLOS FERRARO
INVENTOR.
BY Ivan P. Tashof
Attorney

RAUL CARLOS FERRARO
INVENTOR.

BY Ivan P. Tashof
Attorney

Oct. 29, 1957 R. C. FERRARO 2,811,307

FULL KEY BOARD LISTING-ADDING MACHINES

Filed Aug. 31, 1954 18 Sheets-Sheet 13

RAUL CARLOS FERRARO

INVENTOR.

BY Ivan P. Tashof
Attorney

Oct. 29, 1957 R. C. FERRARO 2,811,307

FULL KEY BOARD LISTING-ADDING MACHINES

Filed Aug. 31, 1954 18 Sheets-Sheet 14

RAUL CARLOS FERRARO

INVENTOR.

BY Ivan P. Tashof

Attorneys

Oct. 29, 1957 R. C. FERRARO 2,811,307

FULL KEY BOARD LISTING-ADDING MACHINES

Filed Aug. 31, 1954 18 Sheets-Sheet 15

RAUL CARLOS FERRARO

INVENTOR.

BY Ivan P. Tashof

Attorney

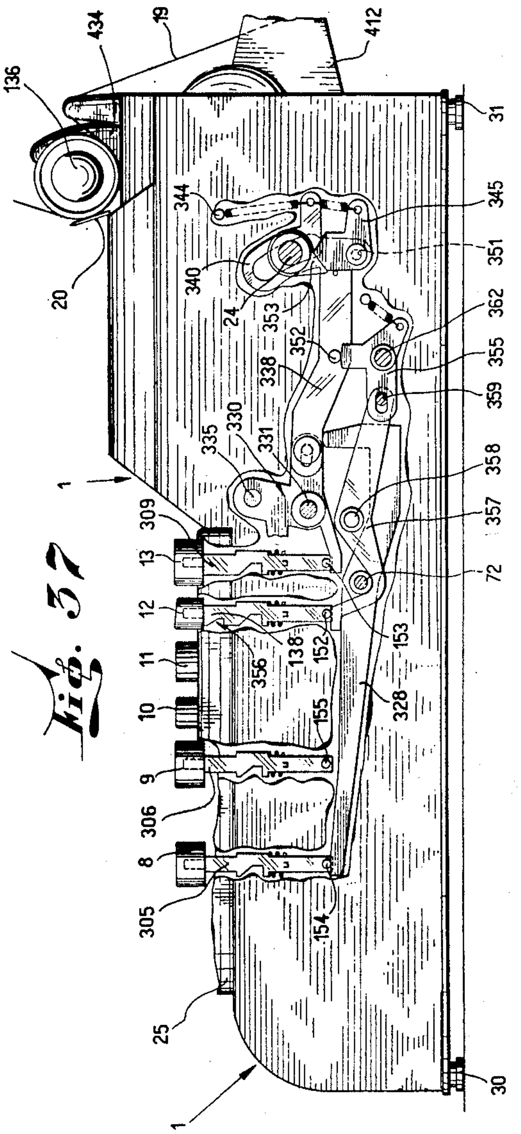
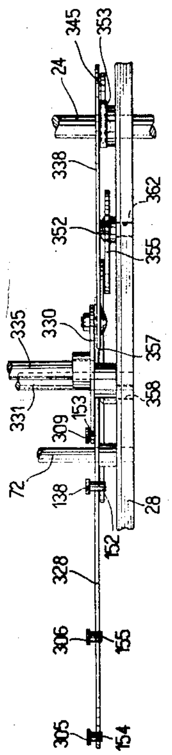
FIG. 38
RAUL CARLOS FERRARO
INVENTOR.
BY Ivan P. Tashof
Attorney Oct. 29, 1957 R. C. FERRARO 2,811,307

FULL KEY BOARD LISTING-ADDING MACHINES

Filed Aug. 31, 1954 18 Sheets-Sheet 17

RAUL CARLOS FERRARO

INVENTOR.

BY Ivan P. Tashof

Attorney

Oct. 29, 1957 R. C. FERRARO 2,811,307

FULL KEY BOARD LISTING-ADDING MACHINES

Filed Aug. 31, 1954 18 Sheets-Sheet 18

RAUL CARLOS FERRARO

INVENTOR.

BY Ivan P. Tashof

Attorney 2,811,307

FULL KEY BOARD LISTING-ADDING MACHINES

Raul Carlos Ferraro, Buenos Aires, Argentina

Application August 31, 1954, Serial No. 453,310

12 Claims. (Cl. 235—60.27)

This invention relates to a calculating machine and more particularly to an adding machine.

Many office tasks being of a repetitive character, naturally adapt themselves to the "division of labour" and consequently to the use of machinery also. Thus a good number of machines and devices have been designed to improve office management. However most of the machinery known is expensive and therefore in many events there is no sufficient justification for the purchase of such appliances.

The calculating machines tend to save labour and time, the latter being in many cases more important than the former in order to speed up a slow routine. The calculating machines promote also accuracy and therefore these mechanical methods are nowadays vitally important and in many events high prices are paid for these calculating machines, even if the purchase signifies an economical problem. Finally the calculating machines avoid monotony which often is the basis of errors, particularly if it is borne in mind that the ordinary clerk is usually incapable of correctly handling a larger amount, even of simple calculations, with a fair degree of accuracy by the mental-manual method and these machines have therefore become a practical necessity for the modern business.

The calculating machines may be used for addition, subtraction, multiplication and division; but as certain types are better adapted for multiplication and division, a technical distinction has grown up in the trade between adding and calculating machines, the latter being used more extensively for multiplication and division.

Since the present invention relates to an adding machine, it has to be pointed out that there are two principal types of adding machines; those which print on paper the amounts being added, and those which do not —the former being known as listing and the latter as non-listing machines—with a visible totalizer.

The present invention relates to a listing machine with a visible totalizer and, more generally speaking the listing machines are again divided into two classes, the first being the full keyboard model carrying a row of keys numbered from 1 to 9 for each column, and the machine of the second class having ten keys in two or three rows. Each of these keys represents a digit, and the depression of a key for an item automatically causes progressive columnar selection. The present invention relates to the first class of adding machine.

The term "adding machine" intends therefore mainly to cover a machine with which adding and subtracting operations may be carried out.

The items are printed on a roll of narrow paper. Multiplication and division may however also be carried out on the adding machine. Thus multiplication is consecutive addition; if for instance 15 is to be multiplied by 4, it is merely added four times. For division, the divisor is subtracted from the dividend as many times as it is contained in that dividend, the number of subtraction being automatically registered on the counting wheels as a quotient.

Even if with the known machines a satisfactory result is obtained from the technical viewpoint of the operation of these machines, it seems however that the economical side, that is to say, the cost of the machine has never been thoroughly analyzed, so that as the result thereof, there is no fully automatic adding machine on the market, the cost of which would be however sufficiently low, so that it may be purchased as well by many medium or small organizations, such as small industries, workshops and the like.

Thus the present invention relates to a full keyboard listing adding machine comprising a plurality of columns of keys and a function control column for giving the command of different operations, each column of keys comprising nine keys, a key stem for each key, a central commanding die integral with each key stem, a slidable ordinal latching slide for each column of keys, nine pins spaced apart mounted on each pin strip and adapted to enter in operative relationship with said commanding dies, a zero stop pawl for each ordinal latching slide, a rack slide for each ordinal latching slide, said zero stop pawl being controlled by said ordinal latching slide and controlling said rack slide, a transfer slide for each rack slide, gear transmission means connecting each rack slide to its respective transfer slide, a totalizer, a printing mechanism, a function control slide, a totalizing arrangement controlled by said function control slide and related to each of said transfer slides and to said totalizator, each transfer slide directly adjusting the type elements of said printing mechanism, said totalizing arrangement including tens transfer means, said function control column including function control means for said function control slide, and driving means for driving said transfer slides and function control slide.

From the above it will be apparent to those skilled in the art that it is an object of the present invention to provide an adding machine the structure of which may be mainly performed by stamping the integrant parts which as such are of simple structure and the required number of which is reduced to a minimum.

Another object is to provide an adding machine, which in spite of being of simpler structure than similar known machines is operated in substantially identical manner, so that no special knowledge will be required for operating it.

Still another object of the present invention is to provide a listing-adding machine of the full keyboard type which is provided with a number of safety devices so that the machine may not be damaged even if an operation is incorrectly performed, such as depressing two keys of the same column or bank.

A further object is to provide an adding machine which prints the successive amounts on a paper at the same time as a totalizator continuously indicated the total amount the machine has stored after each intermediate operation.

Another object is to provide an adding machine in which the slide like elements are all made of straight slides that is to say that the complicated bent elements so common in similar adding machines are avoided and thereby mounting and repair as well as replacement of spare parts is relatively simple.

A further object is to provide an adding machine in which the main operating handle is provided with a safety device which allows operation of said handle even if the machine is damaged without transmitting the movement of said handle to the remaining mechanism of the adding machine.

These and further objects and advantages of the present invention will become more apparent during the course of the following description in which by way of example a structural embodiment, as well as several eventual modifications, have been shown.

In the drawings:

Figure 37 is a side elevation, partially in section of the adding machine, showing in particular the commanding means for the total key, subtotal key, repetition key and correction key, in inoperative position.

Figure 38 is a plan view of the mechanisms shown in Figure 37.

Figure 46 is a side elevation, partially in section, of the rear portion of the adding machine showing in particular part of the printing mechanism.

In the several figures, the same elements or parts have been identified with the same reference numerals.

In most of the figures corresponding to the side elevations of the adding machine with certain parts shown in details, usually a column of digits has been shown instead of the keys corresponding to the function control column.

Figure 1:
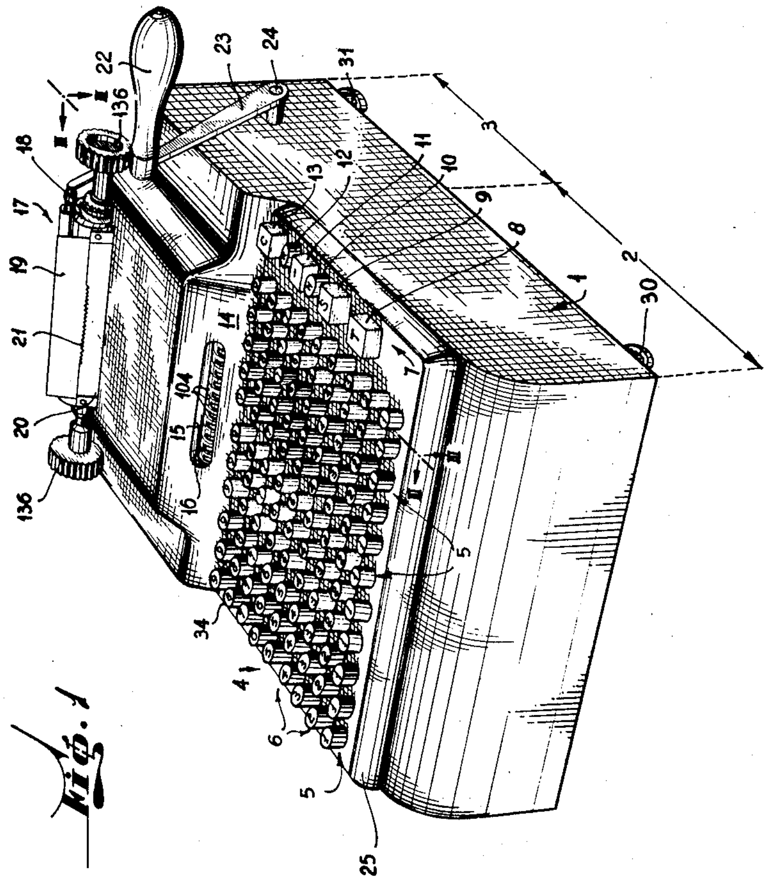
Figure 1 is a perspective view of a listing-adding machine of the full keyboard type, in accordance with the present invention.

As may be seen in Figure 1, the adding machine of the present invention which is a listing-adding machine of the full keyboard type, comprises a casing 1, the front portion 2 of which is of smaller height than the rear portion 3.

The upper part of the front portion 2 comprises a keyboard 4 formed of eleven columns or banks 5, each comprising nine numerical keys 6, each of which bears a different number from one to nine. All keys 6 bearing the number nine of each column 6 are located in a row adjacent the rear portion 3 whilst all keys 6 bearing the number one of each column or bank 5 are located in a row at the front end of the keyboard 4. The remaining rows of numbers are correspondingly located between the above specifically mentioned rows.

It may be added that all the numerical keys 6 are suitably housed in a perforated cover board 25, mounted on the top of the front portion 2 of casing 1.

The key-board 4 further comprises a function control column 7, consisting of a total of six keys, of which key 8 is the total key, key 9 is the subtotal key, key 10 preferably of smaller size, is the non-adding key, key 11 is the subtracting key, key 12 also preferably of smaller size, is the repetition key and finally key 13 is the correction key. The role of each of keys 8 to 13, will be later more specifically analyzed.

The rear portion 3 of casing 1 comprises a front wall portion 14 provided with a longitudinal opening 15 in which a plurality of totalizer drums 104 forming a totalizer 16, is partially visible.

The rear end of casing 1 is provided with a printing mechanism 17, consisting of a drum 18, about which a paper 19 supplied by a paper roll (not visible in this figure) runs. The drum 18 may be hand operated by hand-wheels 136. The paper 19 is guided by a transparent edge guide 20, the upper cutting edge 21 of which enables to cut off the paper 19 emerging out of the guide 20, as is already well known. A main operating handle 22 connected to an operating lever 23 supported by operating shaft 24 enables to carry out each operation marked on the keyboard 4. In some structures it may be advisable to increase the length of lever 23 in order to decrease the rotary speed of shaft 24.

The casing 1 covers the main frame 26 (see Figure 2) consisting of a base plate 27 supporting the outer side plates 28 and the central plates 29 which are likewise divided into a front portion 32 and a rear portion 33 of which again the rear portion is of a larger height than the front portion, similarly as already explained in connection with casing 1. The height of the rear portion of the central plates 29 is larger than the height of the rear portion of the side plates 28 which defines the particular shape also of the rear portion 3 of casing 1.

The base plate 27 is conveniently provided with front rubber plugs and columns 30 (see Figure 1) and rear rubber plugs and columns 31, of which the columns of front rubber plugs 30 may be of smaller height than the columns of the rear rubber plugs 31, in order that the base plate 27 and the adding machine as such, has a suitable inclination with regard to the horizontal plane.

Obviously the same effect may be obtained by supplying front and rear rubber plugs and columns of identical height and compensating the required difference of height internally by the central plates 29 and side plates 28.

Figures 2, 13, 45:
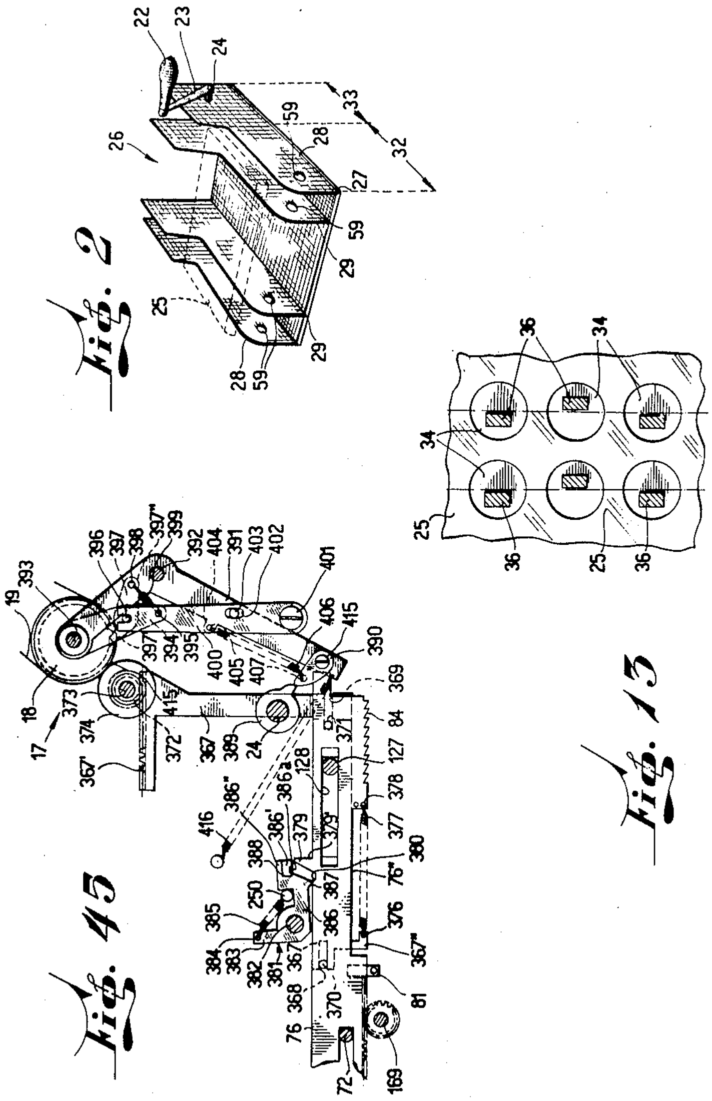
Figure 2 is a perspective view of the main frame of the adding machine and the operating handle connected thereto.
Figure 13 is a plan view from the bottom of a portion of the keyboard, showing the mounting of the digit or key cups of the key items.
Figure 45 is a detail, in side elevation, similar as Figure 42, but showing the mechanisms in operative position.
Figure 3:
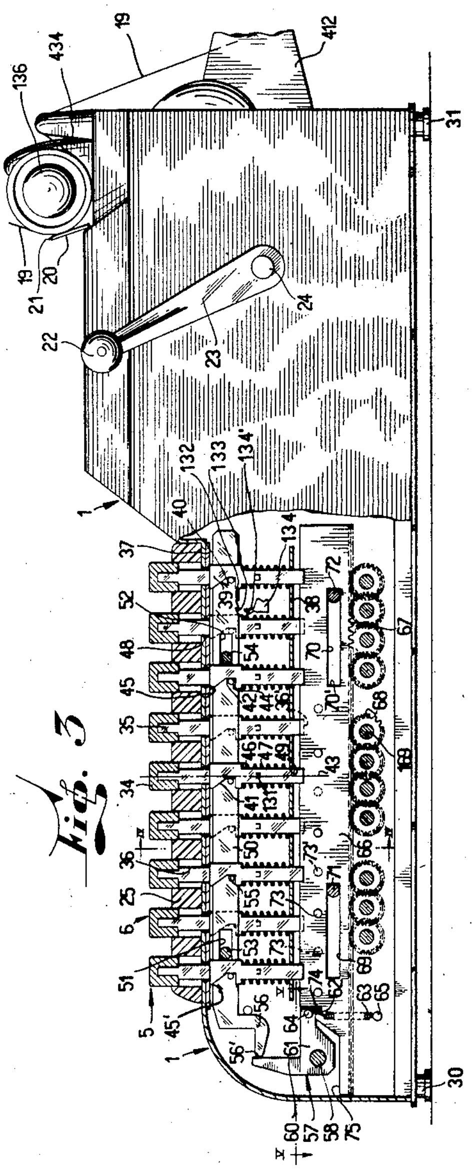
Figure 3 is a side elevation, partially in longitudinal section, of the adding machine, showing in more details one bank or column of a row of keys numbered from 1 to 9 with its operating mechanism, and corresponds substantially to a section along line III—III of Figure 1.
Figure 5:
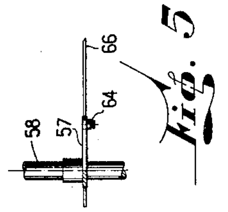
Figure 5 is a cross section along line V—V of Figure 3.
Figure 7:
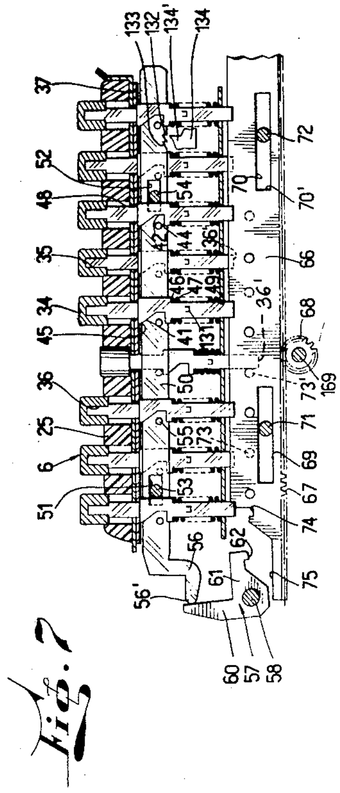
Figure 7 is a detail in side elevation of the same bank or column of row of keys as shown in Figure 3, but with one key in operative position.
Figure 4:
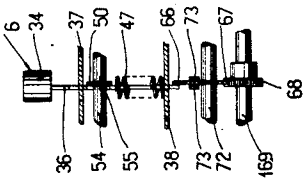
Figure 4 is a cross section along line IV—IV of Figure 3.

As may be better seen in Figure 3 as well as in Figures 4 and 7, each key 6 consists of a digit or key cap 34 eccentrically mounted (as will be later seen when analyzing Figure 13) on the upper end portion 35 of a stem 36 of substantially rectangular cross section guided between the upper guide plate 37 having a corresponding slot or opening 48 and the lower guide plate 38 having a corresponding opening or slot 49. Each guide plate is supported by the plates 28 and 29 (not visible in Figure 3). Each stem 36 comprises a cam detent 39 having a recess 40 defined by an upper inclined face 41, a base 42 parallel to the axis 43 of the stem 36 and a lower horizontal face 44 perpendicular to axis 43. The cam detent 39 further defines an upper shoulder 45 and a lower shoulder 46. The upper shoulder 45 enters in contact with the upper guide plate 37, thus limiting the upward movement of stem 36, whilst the lower shoulder 46 is the base for a helical compression spring 47, the other end of which butts against the lower guide plate 38.

It can thus already be understood, that the helical compression spring 47 tends to drive stem 36 upwardly. A side stop-projection 131 of the lower portion of stem 36 limits the downward movement of the later, that is to say when said projection 131 enters in contact with the lower guide plate 38.

Figure 14:
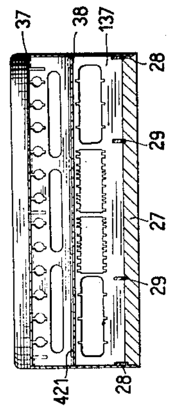
Figure 14 is a cross section through the keyboard showing one of the lateral guides for the ordinal latching slides, rack slides and transfer slides.

Each bank or column of keys 6 is related to an ordinal latching slide 50 having two elongated slots 51 and 52 spaced apart from each other, through which supporting shafts 53 and 54, respectively, pass and which hold said ordinal latching slide 50, together with lateral guides, having a comb-like shape 137 (see Figure 14) in its position. The ordinal latching slide 50 comprises a total of nine short pins 55 alternatively arranged on one end, the other side of said ordinal latching slide 50. Instead of pins 55, each ordinal latching slide 50 may have corresponding cut-out ear projections made of the same slide. Each of said pins 55 corresponds to one of said keys 6. By alternately arranging said pins 55 on one and the other side of said ordinal latching slide 50, the keys 6 may be mounted on the keyboard 4 with a smaller longitudinal separation between each other, so that the total length of the keyboard 4 is smaller. In order that the keyboard 4 has however the usual uniform aligned aspect of the rows of digits 34, the latter are eccentrically, alternately, mounted on stems 36, as shown in Figure 13.

The front end portion 56 of each ordinal latching slide 50 is L-shaped and its free end 56' is in contact with L-shaped zero stop pawl 57, swingably mounted on shaft 58 housed in perforations 59 of side plates 28 and central plates 29 (see Figure 2). This L-shaped zero stop pawl 57 comprises an upwardly extending branch 60 in contact with said free end 56', whilst the other branch 61 is provided with a hooked end 62 connected to a helical tension spring 63 by means of a stub shaft 64 integral with the hooked end 62. Spring 63 is further connected to a stationary projection 65 mounted on base plate 27 (not visible in Figure 3).

Underneath the lower guide plate 38, a rack slide 66 is slidably mounted, having a rack 67 defining the lower longitudinal edge of said slide 66 and meshing with a gear 68 supported by shaft 169. The rack slide 66 comprises two elongated slots 69 and 70 through which corresponding supporting shafts 71 and 72, respectively, pass and which limit the possible longitudinal movement of said rack slide 66, which is furthermore guided by spaced apart lateral comb-like guides 137 (see Fig. 14), similarly as the ordinal latching slides 50, by comb-like lateral guides 420 having supporting ears 421 fixed to the lower guide plate 38.

Similarly as each ordinal latching slide 50, also each rack slide 66 is provided with a number of pins 73, also alternately arranged on both lateral faces of said rack slide 66. Again in this case, pins 73 may be replaced by cut-out ears. The main difference with regard to the ordinal latching slides 50 is that each rack slide 66 has only eight pins, one for each of the keys numbered from one to eight, whilst the key 6 corresponding to number nine does not require any specific pin, since the front edge 70' of slot 70 performs also the function for the pin corresponding to number nine when entering in contact with supporting shaft 72, as will be apparent later on. The front end portion 75 of rack slide 66 comprises a recess 74 in which enters the hooked end 62 of L-shaped zero stop pawl 57 and retains thereby the rack slide 66 in its zero position. The size of the front end portion 75 and more particularly the height of said front end portion 75 of the rack slide 66 is accordingly reduced, so as to leave the necessary free space for the L-shaped zero stop pawl 57, to carry out its oscillating movement, as may be appreciated in Figures 3 and 7, when comparatively analyzed.

Figure 6:
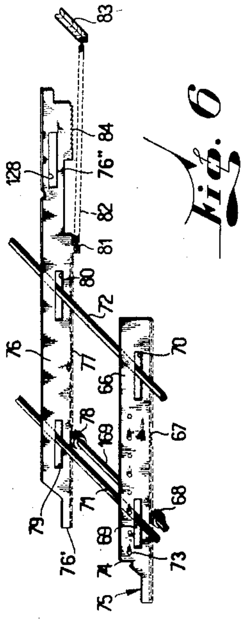
Figure 6 is a schematical perspective view showing part of the transfer mechanism.

Each rack slide 66 is connected to its corresponding transfer slide 76 (see Figure 6). Each transfer slide 76 has a rack 77 defining part of the lower edge of said transfer slide, which rack 77 meshes with gear 78 mounted on shaft 169. Elongated slots 79 and 80 are in register with slots 69 and 70, to permit passing of supporting shafts 71 and 72, which limit the maximum forward and backward movements of each of said transfer slides 76, which are also laterally guided by said comb-shape guides 137 (see Fig. 14). Transfer slide 76 is provided in its intermediate portion with a projecting ear 81 to which a tension spring 82 is connected, the other end of which is connected to an L-shaped bar 83, rigidly connected to the rear ends of side plates 28 and base plate 27 (not shown in Figure 6).

It has still to be added that the rear end portion of each ordinal latching slide 50 (see also Figure 51) comprises two adjacent recesses 132 and 133 located above a clutching lever 134 pivotally mounted on a common commanding pivot 135 for all clutching levers 134 each of which has a corresponding clutching end 134′ capable of clutching either of the recesses 132 and 133, respectively. Once the movement of the main operating handle 22 is started (as will be later described) clutching end 134′ will enter in either of recesses 132 or 133, so as to avoid that during said operation of the main handle 22 and the corresponding calculating mechanisms, it may be possible to depress another key 6, which could damage the machine or at least alter the normal operation of the machine.

The operation of the different devices so far described is as follows:

Supposing that the digit cap 34 of key 6 corresponding to number four is depressed, as shown in Figure 7, the ordinal latching slide 50 will be moved towards the front end of the machine due to the fact that pin 55 will slide along the upper inclined face 41 until resting on the upper shoulder 45 of cam detent 39. This movement is possible because until all the desired keys 6 are depressed on the keyboard 4, obviously the main operating handle 22 is not operated and, whilst said handle 22 is not operated, the clutching lever 134 and more particularly the clutching end 134′ of each of said levers have not yet entered into one of said recesses 132, 133. If one of the keys 6 is depressed, then the clutching end 134′ faces recess 133, whilst if no key has been depressed in the bank or column 5 under consideration, the clutching end 134′ faces recess 132. It will thus be understood that the distance existing between the center lines of the recesses 132 and 133 is equal to the distance existing between the base 42 and the front face of key stem 36 with regard to the two positions the corresponding pin 55 may adopt.

This longitudinal sliding movement of the ordinal latching slide 50 due to the depressing of one key 6, produces at the same time a pushing action of the free end 56′ on the upwardly extending branch 60 of the L-shaped zero stop pawl 57, which will oscillate about its shaft 58 and thereby raising the hooked end 62 and freeing the recess 74 of the rack slide 66, which due to the action of spring 82 will urge to move towards the rear end of the machine, because the latent force of the spring 82 will be transmitted to the transfer slide 76, rack 77, gear 78, shaft 169, gear 68 and rack 67 to the rack slide 66. The length of this sliding movement is controlled by the free end portion 36′ of the key stem 36, which in the example shown in Figure 7 will be equal to such a portion until the corresponding pin 73′ enters in contact with the free end portion 36′ of the depressed key 6.

If one key 6 of one bank or column 5 is depressed, and thereafter another key of the same column is depressed, then whilst said second key is being depressed and the corresponding pin 55 passes by the lateral outer face 45′ of shoulders 45, the formerly depressed key 6 is immediately raised to its unpressed position by helical compression spring 47. It must however be added that even if it is true that after depressing the first key 6 the corresponding hooked end 62 frees the recess 74, the rack slide 66 and transfer slide 76 will not move until freed by another element (pawl 85, see Fig. 8), to which reference will be made later on, but which freeing action takes place when operating the main operating handle 22, so that an error made by depressing a certain key in one column 5 can be easily corrected by depressing the correct key.

It is to be pointed out that the above described mechanisms correspond to one column 5, and therefore these mechanisms are repeated in the other columns present. Thus in Figure 3, a plurality of gears are visible besides the gear 68, which correspond to similar gears as gear 68 for rack slides located behind rack slide 66, shown in Figure 3.

The movement of the rack slide and transfer slide just described is necessary so that the transfer slide may on its turn operate a number of elements, in order to show on the totalizer 16 (see Figure 1), as well as on the paper 19, the operation as marked on the keyboard 4. To this end the transfer slide 76 will now be more specifically analyzed in connection with Figure 8, wherein the latter is shown in combination with the transfer mechanism for transferring the operation marked on the key board 4, to the totalizing mechanism.

Figures 11, 12:
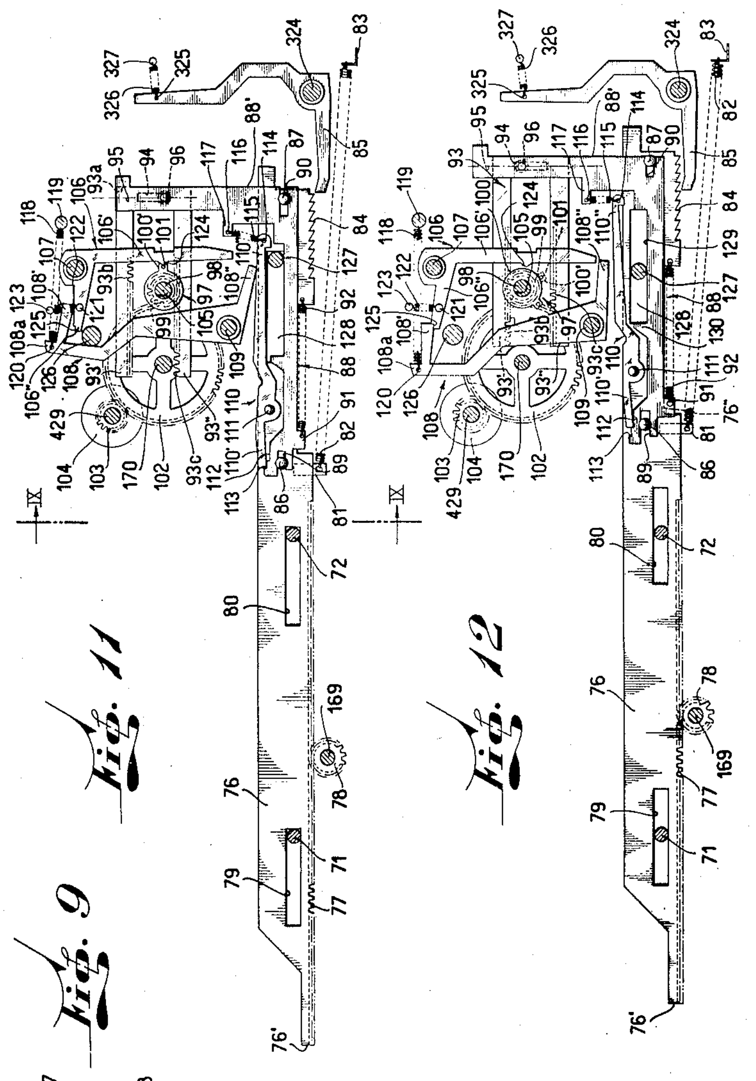
Figures 11 and 12 are details, in longitudinal section, showing the transfer mechanism similarly as in Figure 8, but in different positions during the operation of said mechanism.
Figure 9:
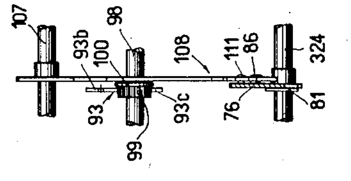
Figure 9 is a cross section along line IX—IX of Figure 11.

The transfer slide so far described comprises a ratchet portion 84 in operative relationship with a pawl 85 mounted on shaft 324 supported by central plates 29 (see also Figure 48) and which is a disengaging means which controls the movement of the transfer slide 76 and its related rack slide 67, that is to say, when pawl 85 releases the ratchet portion 84, as shown in Figures 11 and 12, the transfer slide 76 is free to move backward and thereby transfer the marked operation to the totalizer. The commanding means for operating pawl 85, will be later described.

A first guiding pin 86 and a second guiding pin 87 supported by the rear portion of the transfer slide 76 guide a substantially L-shaped transfer lever 88, provided to this end with slots 89 and 90 (see Figures 11 and 12) respectively. It is thus apparent that the transfer lever 88 may relatively slide along the transfer slide 76 and to this end the front end of the transfer lever 88 is provided with a downwardly projecting ear 91 to which one end of a helical spring 92 is linked, the other end of which is connected to the transfer slide 76 and more particularly to the ratchet portion 84, so that said spring 92 tends to move the transfer lever 88 towards the rear end of the transfer slide 76, as may be appreciated by comparing the position of said transfer lever 88 shown in Figures 8 and 11.

The upwardly directed branch 88′ of the transfer lever 88 slidingly supports a U-shaped totalizer operating rack 93 (see Figure 8) having an upper branch 93′ (see Figure 11), a lower branch 93″ and a base 93*a* with a slot 94, the center line 95 of which is substantially coaxial with the center line of said base 93*a*. A guiding pin 96 rigidly connected to said upper branch 88′ passes through said slot 94 and thereby assures that when transfer slide 76 is moved either towards the front end or rear end of the adding machine, that the U-shaped totalizer operating rack 93 will be moved therewith.

Each U-shaped totalizer operating rack 93 (see Figures 8 to 12) is further supported in a cage (not visible in Figure 8) which will be later described and which determines the position of the totalizer operating rack 93 with regard to each totalizing arrangement 97 housed between the upper branch 93′ and lower branch 93″. The totalizing arrangement 97 comprises a totalizing shaft 98, on which a totalizing gear 99 (only the diameters thereof have been shown) is loosely mounted and a tens transfer disk 100 with a projecting pin 101 mounted on a square tooth like projection 100′. Said tens transfer disk 100 is integral with said totalizing gear 99.

Figure 8:
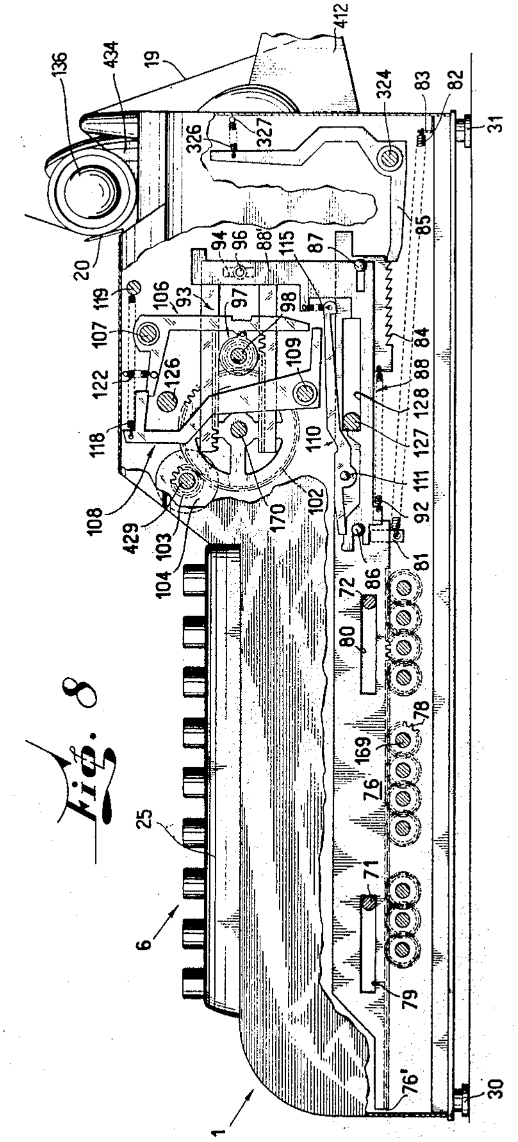
Figure 8 is a side elevation partially in longitudinal section of the adding machine showing the same bank or column of row of keys as Figure 3 and the transfer mechanism for transferring the operation marked to the totalizing arrangement.
Figure 10:
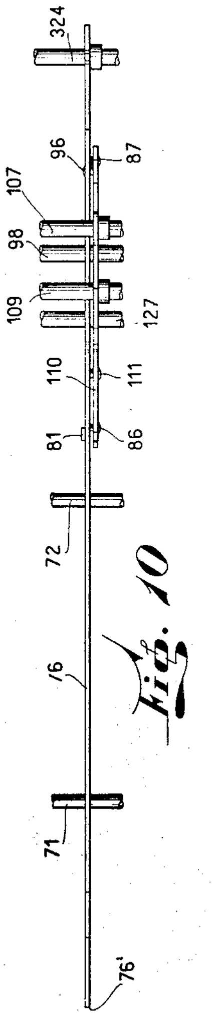
Figure 10 is a plan view of Figure 8, wherein some elements have been omitted.

The upper branch 93′ and the lower branch 93″ each comprise a rack **93*b* and 93*c*, respectively, which may either mesh with the totalizing gear 99 or may be both out of mesh with said totalizing gear 99, as shown in Figure 8. In Figure 11, totalizing gear 99 is meshing with rack 93*c*, corresponding to the lower branch 93″, whilst in Figure 12, totalizing gear 99 is shown as meshing with upper rack 93*b*, of upper branch 93′**.

The counter gear 99 forms also part of a gear train consisting of an intermediate totalizer gear 102 mounted on shaft 170 and meshing with said totalizing gear 99 and totalizer gear 103 mounted on shaft 429 (see also Figure 48) rigidly connected to a totalizer drum 104 on the periphery of which the numbers from zero (0) to nine (9) are successively marked. Each column 5 comprises thus a transfer slide 76 indirectly connected to its totalizing gear 99, which in turn is connected to the corresponding totalizer drum 104 forming part of the totalizer 16 (see Figure 1).

The longitudinal opening 15 enables to see one of the numbers of each drum 104 which corresponds precisely to the numbers stored in the totalizing mechanism after each operation.

In view of the fact that the U-shaped totalizer operating rack 93 is slidably supported by guiding pin 96 and bearing in mind that a cage (not shown so far) determines the position of said U-shaped totalizer operating rack 93, it will be understood that by moving said U-shaped totalizer operating rack 93 downwardly with regard to totalizing shaft 98, that the upper rack **93*b* will mesh with the totalizing gear 99. This position corresponds to the mechanism when the latter is carrying out an adding operation. In this event, when the transfer slide 76 moves towards the rear end of the machine (towards the right side in the drawing) the totalizing gear 99 will rotate in the direction indicated by arrow 105 and since the totalizer drum 104 and gear train is connected to totalizing gear 99, said movement is automatically transferred to said drum 104 and thereby marking the same number as that which has been marked on the corresponding key 6 of keyboard 4. If the U-shaped totalizer operating rack 93 is moved upward by the cage (to be described), rack 93*c* will mesh with totalizing gear 99** and a substracting operation will be carried out, since all the gears will rotate in opposite direction with regard to the adding operation.

An additional mechanism is provided for transferring tens to the next denominational order for instance if one bank or column 5 (see Figure 1) has already marked the amount eight (8) in a previous operation and in the same column the amount five (5) is added, the result of which is thirteen (13), the beforementioned column can only absorb the amount one (1) that is to say from eight to nine, and then another cycle is started from zero, and for each new cycle one unit has to be transferred to next adjacent order of higher value, so that the totalizer will indicate the correct end result which is thirteen (13), or in other words three (3) in the lower value order and one (1) in the higher value order, as is known in the art.

The above referred additional mechanism consists of the tens transfer disk 100, and pin 101, already mentioned, which is loosely mounted on the totalizing shaft 98 and integral with totalizing gear 99, a first tens transfer lever 106 having a long arm 106′ and a short arm 106″ pivotally supported by pivot 107, mounted on central plate 29 (see Fig. 48), a second tens transfer lever 108 pivotally supported by pivot 109 mounted on the central plate 29 (see Fig. 48) and having an upper projection 108′ in functional relationship with said short arm 106″, as will be later seen, and a lower projection 108″ in functional relationship with a third tens transfer lever 110 of the adjacent transfer slide corresponding to the next higher value order. It is thus clear that the third tens transfer lever 110 which is visible in Figure 8 is not in functional relationship with the lower projection 108″ of the second tens transfer lever 108, also visible in Figure 8.

For the purpose of the structural description of the last mentioned third tens transfer lever 110, reference will however be made to Figure 8. Each third tens transfer lever 110 is swingably mounted on a pivot 111 supported by transfer slide 76 and comprises a short arm 110′ in functional relationship with the upper front end of transfer lever 88 which has a first recess 112 and a second recess 113 located above and in front of said first recess 112 with which the short arm 110′ may enter in blocking relationship.

The third tens transfer lever 110 further comprises a long arm 110″ opposite said short arm 110′, said long arm 110″ having a perforation 114 at its free end portion, in which one end of a helical spring 115 is housed the other end of which is connected to perforation 116 of projecting gear 117 integral with the lower portion of upper branch 88′ of the transfer lever 88, thereby maintaining normally the blocking position of the short arm 110′ as shown in Figure 8.

It has still to be added that short arm 106″ has at its free end a recess 125 (see Figure 11) in which, as shown in Figure 8, the free end of upper projection 108′ may be housed, whereby the additional mechanism herein above described is maintained in its inoperative position, to which end a spring 118 is provided, connected at one end to a stationary shaft 119 supported by the central plates 29 (see Figure 48) and at the other end connected to perforation 120 of the upwardly projecting free end portion **108*a* of the second tens transfer lever 108. Similarly the first ten transfer lever 106 and more particularly the short arm 106″ comprises a stub shaft 121 to which one end of helical spring 122 is connected the other end of which is connected to a shaft 123 having a cut out portion 123′ also supported by central plates 29 (see Figure 48). It may be appreciated that the axes of said springs 118 and 122 are substantially perpendicularly arranged so that economy in space is obtained at the same time as the free end of short arm 106″ tends to move upwardly whilst the free end of upper projection 108′ tends to move downwardly and thereby maintaining the free end of upper projection 108′ in the recess of short arm 106″**, as already explained.

Finally it has still to be added that the long arm 106′ has a tooth like projection 124 capable of entering in contact with the projecting pin 101 of the square tooth like projection 100′ of tens transfer disk 100 and thereby carrying out the transfer of tens as above referred to, and which will be now described.

Analyzing now the operation of the transfer mechanism described in relationship with Figures 8 to 12, as well as in relationship with Figures 3 and 7, it has to be stated that the position shown in Figure 3 of the keyboard arrangement corresponds to the position shown in Figure 8 of the transfer mechanism; in other words Figure 8 shows the "zero" position, that is to say that neither in the column corresponding to the transfer slide 76 shown in Figure 8 nor in the adjacent denominational order corresponding to the tens transfer disk 100, any operation has been carried out previously and stored in the transfer mechanism. In this position, as may be seen in Figure 8, the transfer slide 76 is in its most forward position and blocked in said position by pawl 85. The U-shaped totalizer operating rack 93 is in its neutral position and the square tooth like projection 100′ and its projecting pin 101 are located adjacent the tooth-like projection 124 and below the latter.

If an addition has to be carried out, no key of the function control column 7 (see Figure 1) has to be depressed, because automatically upon operating the main operating handle 22 the machine is so constructed and arranged that it will carry out an adding operation, that is to say the totalizing gear 99 will mesh with the upper rack 93*b*, as shown in Figure 12. If, on the contrary a substracting operation is to be carried out, the substracting key 11 (see Figure 1) has to be depressed, so that upon operating the main operating handle 22, the lower rack 93*c* will mesh with the totalizing gear 99, as shown in Figure 11. Upon operating the main handle 22, which implies of course that previously the different keys 6 of columns 5 have been operated, in a determined moment, the pawl 85 will move into the position as shown in either of Figures 11 or 12, as will be later explained and spring 82 will drag the corresponding transfer slide 76 towards the rear end up to a position which is delimited by the free end portion 36' of the key 6 (see Figure 7). Assuming that the key 6 corresponding to number four (4) of the column 5 shown in Figure 7 has been depressed, and that the machine is arranged for an adding operation, that is to say that totalizing shaft 98 will rotate in the direction indicated by arrow 105, the square tooth-like projection 100' of this denominational order and which is located in the next higher denominational order, will adopt a position as that shown in Figure 12, in full line. By comparing the position of the square tooth-like projection 100' in Figures 8 and 12, it can be seen that the arm described by said square tooth-like projection 100' corresponds to $\frac{4}{10}$ of the complete circumference. During this movement, the transfer lever 88 has not been moved relatively to the transfer slide 76 and the first tens transfer lever 106, second tens transfer lever 108 and third tens transfer lever 110 have not been moved either.

Assuming now that the above described operation has been completed, the totalizer 16 will indicate the number four (4) visible through the longitudinal opening 15 (see Figure 1) on the corresponding totalizer drum 104. As will be later seen, the transfer slide 76 and associated parts, as shown in Figure 6 are then automatically returned to the initial start position during which return movement the U-shaped totalizer operating rack 93 (see Figure 8) is out of mesh with the totalizing arrangement 97, so that the latter maintains the quantity stored in the previous operation, which obviously has also been marked on the paper 19, as also will be later seen.

Assuming now that, as a second operation in the same column 5 shown in Figure 7 an additional amount is marked which represents an "excessive amount," for instance the number eight (8); it will be necessary that in the denominational order where the number four (4) is stored, the number two (2) will appear on the totalizer and in the next higher denominational order the number one (1) should appear. To this end the tens transfer mechanism enters in operation. The movement has to be analyzed in two separate steps. Upon depressing the key 6 corresponding to the number eight (8), as already previously explained in connection with Figures 6 and 7, the rack slide 67 and transfer slide 76 will advance towards the rear end of the machine in an amount corresponding to eight units and the totalizing gear 99 corresponding to this denominational order will rotate, that is to say the square tooth-like projection 100' and projection pin 101 will again rotate in the direction shown by arrow 105, starting from the full line position marked in Figure 12, until reaching the dotted line position, also shown in Figure 12. During this movement the square tooth-like projection 100' will describe an arc which on the corresponding totalizer drum 104 will have the effect of very quickly showing in the longitudinal opening 15 the numbers five (5), six (6), seven (7), eight (8), nine (9), zero (0), one (1) and will stand still in the position number two (2). It can thus be seen that the square tooth-like projection 100' and projecting pin 101 passes by the "zero" position, as shown in Figure 11. In this figure the U-shaped totalizer operating rack 93 is shown in the "substracting position," which does not correspond to what is now being described. During this movement when passing from position nine (9) to the "zero" position, the next higher denominational order must be advanced in one unit. This movement is as such best shown in Figure 11, where projecting pin 101 is shown when pushing the tooth-like projection 124 of the first tens transfer lever 106, which against the latent force of spring 122 swings the first tens transfer lever 106 about its pivot 107, whereby the recess 125 of short arm 106'' is withdrawn from the free end of upper projection 108' which enables spring 118 to swing said second tens transfer lever 108 about its pivot 109 until entering in contact with stop 126, to which specific reference will be made later on, whereby the lower projection 108'' presses on the long arm 110'' of the third tens transfer lever 110 against the latent force of spring 115, and which swings about its pivot 111, whereby the free end of short arm 110' is withdrawn from the first recess 112 of transfer lever 88 and thereby the spring 92 slides said transfer lever towards the rear end of the transfer slide 76 within slots 89 and 90 until the free end of short arm 110' enters in contact with the second recess 113 of the transfer lever 88. This relative advancing movement of the transfer lever 88 mounted on the transfer slide 76 in the next higher denominational order causes the upper branch 88' thereof to advance the U-shaped totalizer operating rack 93 in the extent corresponding to one unit which is also advanced on the totalizing arrangement 97 and transferred through the gear train 99, 102 and 103, to the corresponding totalizer drum 104 and also by other means, to be described later on, to the printing mechanism 17.

It has now still to be seen how during the backward movement of the whole mechanism, that is to say when the transfer slide 76 is moved again to the "zero" position, as already above described, the first and second tens transfer levers 106 and 108, respectively, are again rearranged to occupy the position shown in Figure 8, that is to say that the free end of the upper projection 108' meshes again with the recess 125 of the short arm 106''.

This will however be specifically described when analyzing the movement of pin 126, which has a forward and backward movement. Nevertheless in order to give a preliminary idea thereof, it may be stated that when each new operation begins the pin 126 moves from a front end position to a rear end position of slot 425 (see Figure 48), that is to say towards the rear end of the machine, thus enabling the tens transfer operation, as previously described.

The second movement which pin 126 is capable of carrying out is from the rear end position to the front end position, in which event in case a tens transfer has been previously carried out, and the first and second tens transfer levers 106 and 108 are in the position shown in Figure 11, the pin 126 will contact the second tens transfer lever 108 and produce a counterclockwise rotation about pivot 109 raising the upper projection 108' and thus spring 122 will raise the short arm 106'' to establish again the position as shown in Figure 8.

So far it has been described how the first tens transfer lever 106 and the second tens transfer lever 108 are returned to their original or start position. It has still to be seen how the transfer lever 88 and the third tens transfer lever 110 are returned to their respective start positions. To this end a main start position returner shaft 127 hereinafter simply called "main returner shaft," the driving of which will be later explained, is housed in a longitudinal slot 128 of the transfer slide 76 and a longitudinal slot 431 of each central plate 29 (see Figure 48).

More particularly, said main returner shaft 127 passes through all the transfer slides 76, so that the movement of said shaft 127 simultaneously returns all the transfer levers 88 and third tens transfer levers 110 to their original positions.

Each transfer lever 88 comprises a projection 130 and a recess 129 which coincide with the corresponding peripheral portion of slot 128, when said transfer lever 88 is in its original start position.

As soon as the counterclockwise rotation of the main operating handle 22 starts, the main returner shaft 127 will move towards its rear end position, as shown in Figure 11, so that if a tens transfer has to be carried out, the projection 130 may advance, as will already be understood, with regard to the front end of slot 128. At the end of the counterclockwise rotation, that is to say when the main operating handle 22 returns to its starting position, the main returner shaft 127 will move toward its front end position, that is to say that shown in Figure 8 and thereby pushes the transfer lever 88 by contacting the projection 130 towards the front end 76' of transfer slide 76 at the same time as spring 115 of the third tens transfer lever 110 will raise the long arm 110'' and consequently lower the short arm 110', which will enter in the first recess 112 and thereby block again the transfer lever 88 in its original start position.

When analyzing the U-shaped totalizer operating rack 93, it was stated that the latter is supported in a cage and that said cage will determine the position of the totalizer operating rack 93 and more particularly of all the totalizer operating racks 93 corresponding to the different banks or columns 5 (see Figure 1). In order to describe the function control commanding operation for the cage and related operations thereto, reference will now be made mainly to Figures 15 to 19.

Figure 15:
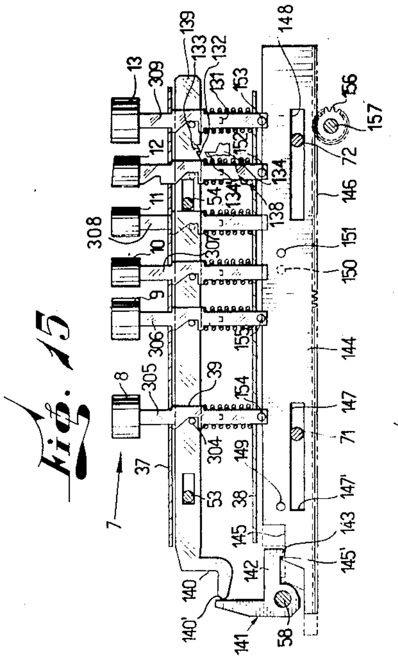
Figure 15 is a side elevation, partially in section of the adding machine showing in particular the function control column or bank.

In Figure 15 the function control column 7 is again shown, comprising the total key 8, the subtotal key 9, the non-adding key 10, the subtracting key 11, and the correction key 13, each of which are mounted on strip-like key stems 305, 306, 307, 308 and 309, respectively, similarly as the strip-like key stems 36 (see Figure 3). An exception exists however in the structural arrangement of the strip-like key stem 138 (see Figure 15) of the repetition key 12, which will be analyzed later on, when referring to the operation of repetition. The upper guide plate 37 and the lower guide plate 38 likewise guide said stems 305 to 309 and 138. Furthermore the supporting shafts 53 and 54, as well as the comb 137 (not shown in Figure 15, see Figure 13) suitably guide a slidable function control latching slide 139 which is of similar structure as the slidable ordinal latching slide 50 (see Figure 3). Likewise the slidably function control latching slide 139 comprises an L-shaped front end portion 140 having a free end 140' in operative relationship with an L-shaped stop pawl 141 mounted on shaft 58 and being of similar structure as the L-shaped zero stop pawls 57 with the exception that the "other branch" 142 is longer, so that its hooked end 143 is at a larger distance from shaft 58. The L-shaped stop pawl is in operative relationship with a function control rack slide 144 of similar structure as rack slide 66 (see Figure 3) with the exception that its recess 145 is longer than the recess 74 of rack slide 66. The function control rack slide 144 likewise comprises a rack 146 and elongated slots 147 and 148, through which supporting shaft 71 and 72 pass, respectively.

Furthermore the function control rack slide 144 likewise comprises a number of stop pins such as the total stop pin 149, the subtracting stop pin 150 and the non-adding stop 151. The total stop pin 149 is adapted to enter in "stop" contact the total strip like stem 305.

The subtotal key 9 and more particularly its stem 306 is not related with a special stop pin inasmuch as the subtotal position, as will be later explained, is established by supporting shaft 71 and the front edge 147' of the slot 147.

The non-adding stop pin 151 is adapted to enter in contact with the non-adding strip-like stem 307; likewise the subtracting stop pin 150 which projects out of the opposite face of the function control rack slide 144 with regard to the non-adding stop pin 151, is adapted to enter in contact with the subtracting strip-like stem 308.

The repetition key 12 and the correction key 13 are not in operative relationship with the function control rack slide 144, but with a special mechanism, as will be later described. To this end each of the stems of said last mentioned keys 12 and 13 are provided at its lower end portion with respective projecting pins 152, 153 and likewise the total key stem 305 is provided with a projecting pin 154 and the subtotal key stem 306 is provided with a projecting pin 155, which may also enter in contact with said special mechanism, to be described later on.

Similarly as rack slide 66 (see Figure 3) also the function control rack slide 144 is related to a gear 156 (see Figure 15 and also Figure 16) mounted on a shaft 157, further supporting a gear 158 which transmits the movement of the function control rack slide 144 to a function control transfer slide 159 of similar structure as the transfer slide 76 (see Figure 6) and therefore also comprises a rack 160, elongated slots 161 and 162 through which respectively shafts 71 and 72 pass. Likewise a slot 163 enables the passage of the main return shaft 127 (not shown in Figure 16). A spring 165 is connected to a projecting ear 164 and to the L-shaped bar 83 and carries out the same function as each of the springs 82 shown in Figure 6.

It has still to be added that the function control latching slide 139 comprises a plurality of pins 304 similar as pin 55 (see Figure 3) which enter in operative relationship with the respective cam detent 39, as already described in connection with Figure 3.

The function control latching slide 139 comprises also a ratchet portion 166 which however is not necessary and is only provided in order to be able to use for the production a single die for the transfer slides 76 and function control transfer slide 159.

If the operator desires to carry out an adding operation, as already previously stated, no operation on any of the keys of the function control column 7 is necessary, and yet the machine has to dispose the cage which supports the U-shaped totalizer operating racks 93 into the adding position, this is achieved by merely operating the main operating handle 22 which will move the main returner shaft 127 towards the rear end, whereby spring 165 will be able to pull function control transfer slide 159 towards the rear end of the machine together with the function control rack slide 144 in an extent equal to the length of recess 145, as may be seen in Figure 15, wherein in dotted lines the front end portion of the function control rack slide 144 is shown when in its inoperative position.

If the operator desires to carry out a subtracting operation the function control rack slide 144 and the function control transfer slide 159 will move towards the rear end of the machine in an extent equal to the distance which the subtracting stop pin 150 will move in order to enter in contact with the previously depressed subtracting key strip 308 and thus the free end 140' will cause the rotation of the L-shaped stop pawl 141 and disengage the function control rack slide 144.

The same sequency of operation will be performed for carrying out other operations, such as total taking and subtotal taking, in each of which events the function control rack slide 144 and the function control transfer slide 159 will move along a different length of path, which as a result will suitably arrange the cage, as will be now described.

Figure 18:
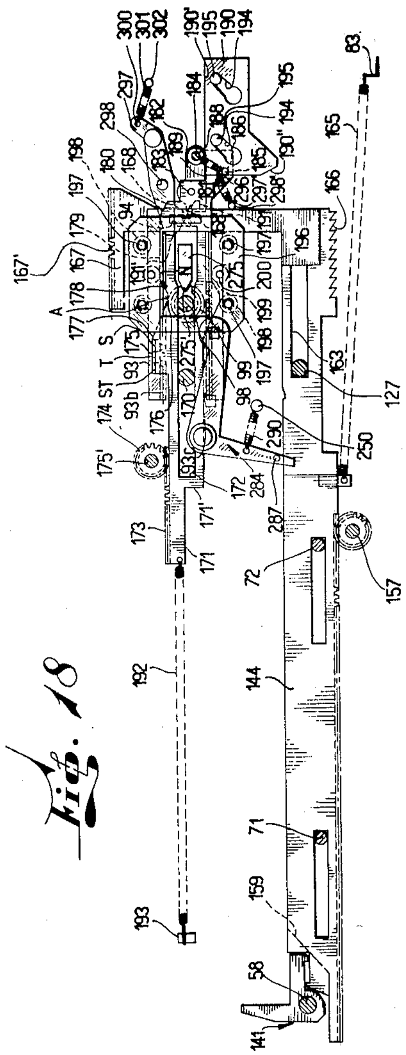
Figure 18 is a detail, in longitudinal section, showing part of the same mechanisms of Figure 17, but in the "neutral" position.
Figure 19:
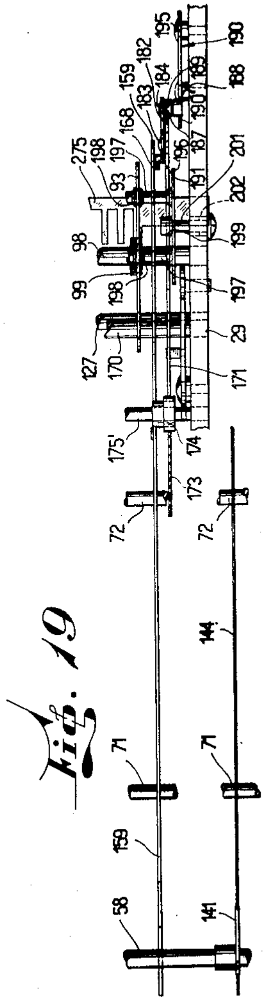
Figure 19 is a plan view of Figure 18.

As may be seen in Figures 18 and 19, wherein the pertinent portion of the adding machine is shown in the "zero" position, that is to say before the main operating handle 22 is operated, the rear end portion of the function control transfer slide 159 is integral with a function indicating rack column 167 having a function indicating rack 167′ which meshes with a function indicating drum (not shown in Figure 18) which forms parts of the printing mechanism (also not shown in Figure 18) and which indicates on the paper what type of operation is performed such as addition, subtraction, etc. In order to avoid overburdening of Figure 19 the operation indicating rack column 167 has been omitted.

A first plug 168 having a lower inclined surface 168′ projects out of said function indicating rack column 167 at a portion intermediate said function indicating rack 167′ and said function control transfer slide 159. In Figure 19 said first plug 168 is shown as directly adjacent to the function control transfer slide 159 of which it actually forms an integral part through said function indicating rack column 167.

The two central plates 29 support between their inside faces, that is to say those faces which are in front of each other, the corresponding intermediate totalizer gear shaft 170 (see Figures 17, 18, 48, 49 and 50) each of which supports a function control slide 171 having a longitudinal slot 172 and said function control slides 171 are furthermore supported by totalizing shaft 98 and guiding pin 422 (see Fig. 49) slidably mounted in slot 423 whereby said function control slides 171 are suitably slidably supported.

The front portion of each function control slide 171 comprises a rack 173 meshing with a gear 174 (see also Figures 18 and 19) mounted on a shaft 175′ supported by the central plate 29 and which shaft 175′ further supports a second identical gear (174) meshing with a second identical rack (173) of the second identical function control slide (171) adjacent to the other central plate 29. This arrangement assures that the two function control slides 171 (of which only one is shown) will move parallelly and inasmuch as these function control slides 171 define the position of the cage, as will be immediately seen, it is necessary that these function control slides 171 move perfectly parallel so as to avoid any bending effect on the cage.

Figures 39, 49, 50:
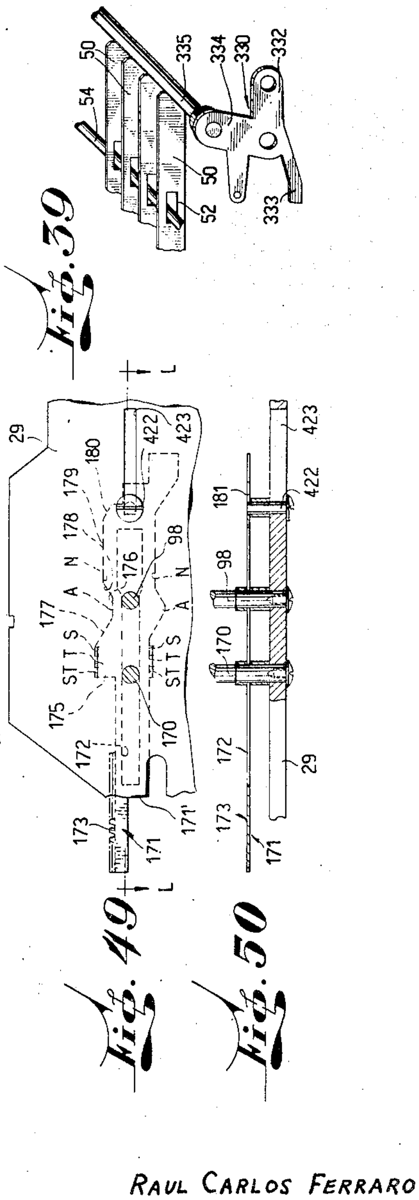
Figure 39 is a detail in perspective view of the pin strips disengaging shaft and related parts.
Figure 49 is a detail, in side elevation, of the central plate and function control slide.
Figure 50 is a plan view, partially in section, along lines L—L of Figure 49.
Figures 42, 43:
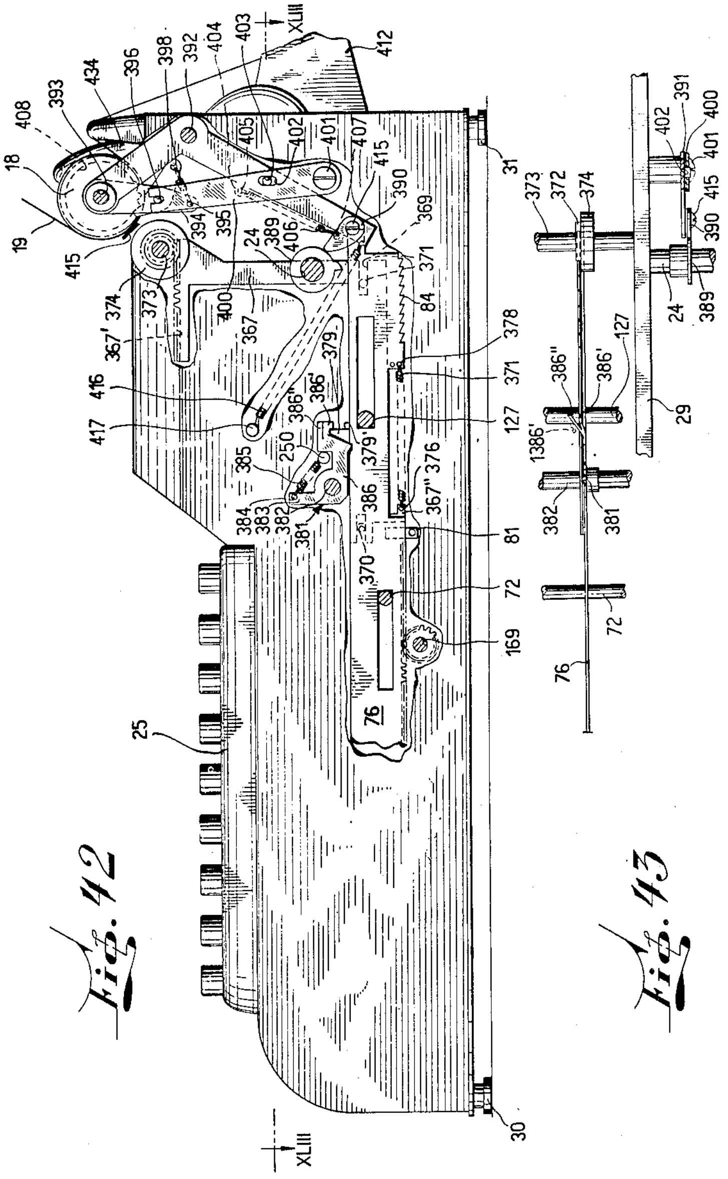
Figure 42 is a side elevation, partially in section of the adding machine, showing in particular the printing mechanism in inoperative position.
Figure 43 is a plan view of the mechanisms shown in Figure 42, along line XLIII—XLIII.

Adjacent the rear end portion of the rack 173 and spaced apart therefrom, the function control slide 171 comprises an upwardly projecting portion defining a substantially horizontal upper edge 175 which, as will be later understood, is divided into three theoretical portions as indicated in Figures 18 and 49, a front portion identified by ST corresponding to the subtotal position of the cage, a middle portion identified by T corresponding to the total position and a rear portion identified by S corresponding to the subtracting position.

Each selector 171 furthermore comprises a substantially horizontal lower edge 176 corresponding to the addition position and linked to the substantially horizontal upper edge 175 by a first inclined plane portion 177.

This lower edge 176 is further identified by reference character A corresponding to "addition." A second inclined plane portion 178 links the substantially horizontal lower edge 176 with a substantially horizontal intermediate edge 179, the front portion of which is further identified by reference character N indicating the "neutral" or "zero" position of the cage.

Similar portions ST, T, S, A and N are provided in the lower portion of the function control slide 171 and in order to avoid overburdening of Figure 18, the reference characters have not been indicated, but see Fig. 49.

The upper rear end portion of the function control slide 171 is defined by an inclined plane portion 180, which enters in operation when a subtotal or total is desired to be obtained, as will be later seen.

Each function control slide 171 further comprises a rearwardly projecting ear 181 on which a disengaging arm 182 is pivotally mounted by means of pivot 183. The rear end of the disengaging arm 182 comprises a stub shaft 184 to which one end of a spring 185 is engaged the other end of which is connected to a pin 186 mounted on the rearwardly projecting ear 181. On said stub shaft 184 (see also Figure 19, wherein the spring 185 has been omitted) a first roller 187 and a second roller 188 are mounted and conveniently separated so as to enable to hook the spring 185. The first roller 187 engages the rear horizontal edge 189 of the function control slide 171, thereby avoiding that spring 185 may lower the disengaging arm 182 further down, whilst the second roller 188 engages the actuating surface 190′ of the cam plate 190. The front end of the disengaging arm 182, that is to say on the other side of the pivot 183, is provided with a second plug 191 having an upper inclined surface 191′ and which second plug may operatively engage said first plug 168.

The front end of each function control slide 171 is further engaged to one end of tension spring 192, the other end of which is engaged to a pin 193 mounted on the upper guide plate 37.

Figure 48:
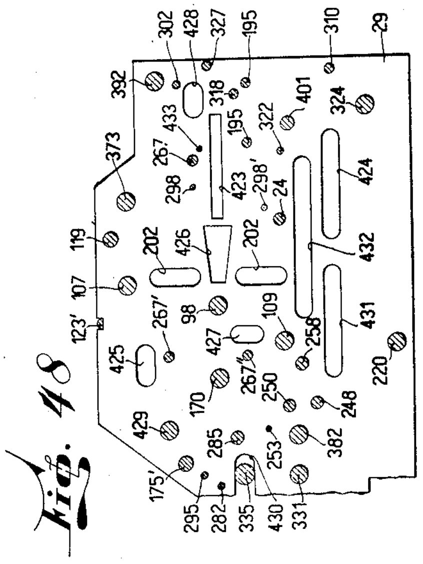
Figure 48 is a side elevation of the rear portion of a central plate showing the disposition of the different slots, borings and the like, for the main means supported by these central plates.

The cam plate 190 comprises two 45′ inclined slots 194 through which guiding pins 195 pass and which support said cam plate 190, said guiding pins 195 are supported by central plates 29 (see Figure 48). The cam plate 190 is integral with the lower cam projection 190″ and which is operated by a cam operator, as will be later seen. A boring 296 enables to connect one end of tension spring 297 thereto, the other end of which is connected to pin 298′ mounted on central plate 29 (see Figure 48).

The cage consists of two parallelly disposed outer frames 196 linked together by four rods 197 having suitably spaced slots 198 along which the U-shaped totalizer operating racks 93 slide and more particularly each of the upper branches 93′ will be guided by two of the upper slots 198 and each of the lower branches 93″ will be guided by two of the lower slots 198 of rods 197. Each of the frames 196 further comprises an upper and lower cage position determining roller 199 each mounted on a stub shaft 200. Each of the frames 196 further comprise: an outwardly projecting guiding rod 201 passing through a vertical slot 202 (see also Figure 48) of the central plate 29 for upwardly and downwardly guiding the cage. It can now already be understood that by suitably forward or backward moving the function control slide 171, the cage position determining rollers 199 will be located on either the upper edge 175, the lower edge 176 or the intermediate edge 179, thereby raising and lowering the cage and therewith the U-shaped totalizer operating racks 93, which consequently will either be out of mesh with the totalizing gears 99 or mesh with the upper racks 93*b* or lower racks 93*c*, respectively. In the position shown in Figure 18, the totalizing gears 99 are out of mesh, whilst in the position shown in Figure 17, which corresponds to the "adding" position the totalizing gears 99 mesh with the upper racks 93*b* and if the rollers 199 would be arranged on the upper edge 175, the lower racks 93*c* would mesh with the totalizing gears 99.

It remains to be seen how both function control slides 171 are moved towards the rear end of the machine in order to arrange the cage in the position in accordance with what function the operator desires to perform.

Figure 17:
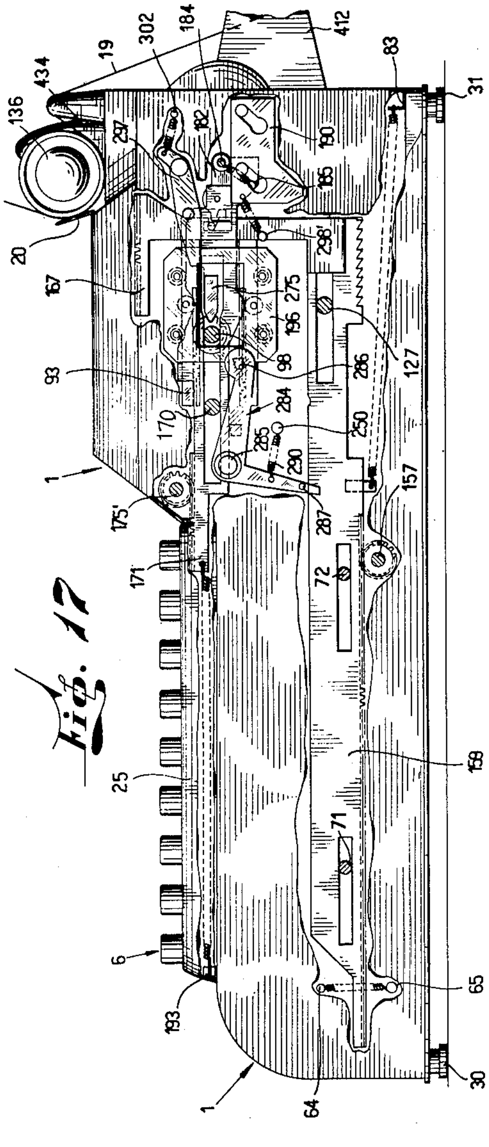
Figure 17 is a side elevation, partially in longitudinal section, of the adding machine showing in more details the function control column and the commanding mechanism related thereto, when in the "adding" position.
Figure 16:
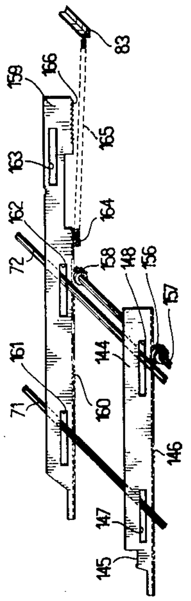
Figure 16 is a schematical perspective view showing the transfer means related to the function control column.

Assuming that an addition is to be carried out, it has to be admitted for the time being, that upon operating the main operating handle 22, the main returner shaft 127 is displaced towards the rear end, whereupon spring 165 will move the function control rack slide 144 towards the rear end until the hooked end 143 (see Fig. 15) engages the projection 145′ of the recess 145. This movement is transmitted through the function control transfer slide 159 (see Fig. 19) to the function indicating rack column 167 and inasmuch as the first plug 168 is in pushing contact with the second plug 191, the latter will also be pushed towards the rear end portion of the machine and bearing in mind that the second plug is mounted on the disengaging arm 182 supported by the function control slide 171, the latter will also be moved, in opposition to tension spring 192, towards the rear end of the machine until the cage position determining rollers 199 are lowered to the lower edge 176 corresponding to the "adding" position as shown in Figure 17, whereby the upper racks **93*b* enter in meshing relationship with the totalizing gears 99**.

As soon as this step is performed, the pawls 85 will liberate the ratchet portions 84 (see Figure 8), whereupon the U-shaped totalizer operating racks 93 will move towards the rear end in accordance with the numbers or amounts marked on the keyboard 4 (see Figure 1), as previously explained.

When this movement is performed, the main operating handle 22 has substantially reached the lower end of its operating path and it has now to be explained how the cage will return to its "zero" or neutral position during the upward or return movement of the main operating handle 22.

To this end reference will now be made to Figures 20, 21 and 22. The operating shaft 24 which passes through one of the side plates 28 is supported at its other end of reduced diameter by the adjacent central plate 29 (see Figure 48). On said operating shaft 24 an operating arm 203 is rigidly mounted having at its free end portion a spring supporting pin 204 connected to one end of a tension spring 205, the other end of which is connected to another spring supporting pin 206 mounted on a gear sector 207 loosely mounted on said operating shaft 24. A stop pin 229 determines one end position of said operating arm 203.

Figure 22:
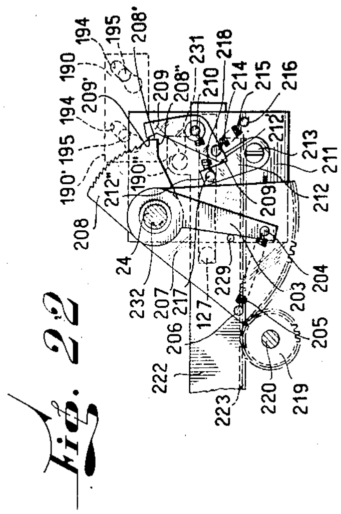
Figure 22 is a side elevation, partially in section, of part of the mechanisms shown in Figure 20, corresponding to the position when the main operating lever has completed its counterclockwise rotation.
Figures 20, 21:
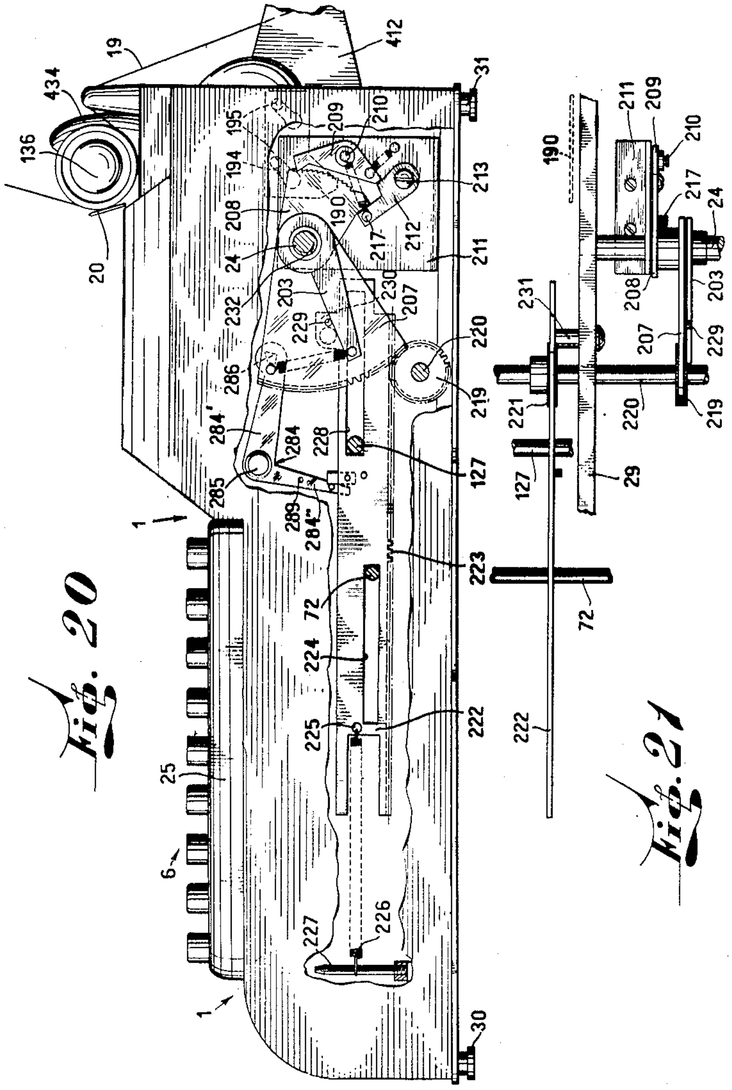
Figure 20 is a side elevation, partially in section, of the adding machine, showing in particular the driving means related to the main operating handle and its operating shaft, in its inoperative position.
Figure 21 is a plan view of the mechanisms shown in Figure 20.

A ratchet sector 208 is furthermore rigidly mounted on said operating shaft 24 and is adapted to mesh with a pawl 209 swingably mounted on pivot 210 mounted on supporting plate 211 connected to the base plate 27 (not shown in Figures 20 to 22, see Figure 2). The supporting plate 211 further comprises a pawl engaging lever 212 supported by pivot 213 also mounted on said supporting plate 211.

The pawl 209 comprises a pawl actuating end portion 209′ and a free end portion 209″ which is provided with a spring supporting pin 214 to which one end of a tension spring 215 is engaged the other end of which is connected to a spring supporting pin 216 mounted on the supporting plate 211.

The pawl engaging lever 212 comprises a recess 212′ and a free end portion 212″ which bears a spring supporting pin 217 to which one end of a tension spring 218 is connected, the other end of which is connected to the pivot 210.

The gear sector 207 meshes with a gear 219 mounted on shaft 220 supported by central plates 29 (see Figure 48). Shaft 220 further supports a carriage driving gear 221 (see Figure 21) which meshes with a carriage 222. A similar carriage is arranged at the opposite side portion, driven by a similar carriage driving gear (221, not shown) in order to operate the other carriage (also not shown).

Each carriage 222 comprises a rack 223 which actually meshes with the carriage driving gear 221. An elongated slot 224 permits the passage of supporting shaft 72. The front end of carriage 222 comprises a boring 225 into which one end of a tension spring 226 is engaged, the other end of which is engaged to a support 227 mounted on the base plate 27. The rear end portion of the carriage 222 comprises an elongated slot 228 through which the main returner shaft 127 passes and furthermore comprises an upwardly projecting ear 230 having a cam actuating pin 231 passing through slot 432 of the central plates 29 thereby forming a guide for the rear end of each carriage 222.

Upon operating the main operating handle 22 downwardly in counterclockwise direction, the operating shaft 24 will rotate in the direction indicated by arrow 232, whereupon the commanding arm 203 will drag along the gear sector 207 through tension spring 205. In case there is a resistance in the mechanism due to false operation or damage for example, the gear sector 207 will not be forced to move further on even if the main operating handle 22 continues its path, because the tension spring will then be expanded, whereby it is assured that the adding machine will not be further damaged, and at the same time it will not operate.

The gear sector 207, when normally operating, transmits its movement through gears 219 and 221 to the carriage 222, which will move towards the rear end. At the same time the pawl actuating end portion 209′ allows that the handle 22 is moved downwardly, but avoids that in the middle of the path the handle 22 may be moved back to its start position, due to the meshing with the ratchet sector 208. When the handle 22 is about to reach its lowermost position, the pawl actuating end portion 209′ will be moved outwardly, as shown in Figure 22, due to the fact that it enters in contact with the first cam surface 208′ of the ratchet sector 208, whereby the free end portion 209″ is raised above the recess 212′ in opposition to tension spring 215 and at the same time the tension spring 218 will swing the pawl engaging lever 212 in clockwise direction, so that the pawl 209 is maintained in disengaged position with regard to the ratchet sector 208, as shown in Figure 22, so that the handle 22 may freely return to its start position due to spring 226 which operates on carriage 222 and transmits the necessary force. As soon as the handle 22 is about to reach its start position during its return movement, the second cam surface 208″ of the ratchet sector 208 enters in contact with the free end portion 212″ and rotates the pawl engaging lever 212 in counterclockwise direction in opposition to spring 218 liberating the free end portion 209″ so that pawl 209 again adopts the position shown in Figure 20 with its pawl actuating end portion 209′ engaging the ratchet sector 208.

Figure 23:
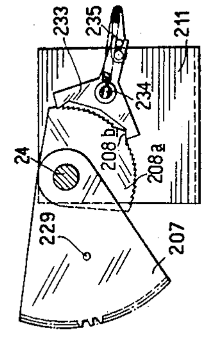
Figure 23 is a side elevation of a modified embodiment corresponding to the mechanisms shown in Figure 22.

If it is desired to provide a mechanism which assures that the handle 22 can not be improperly operated either during the downward or during the upward movement, the pawl 209 and pawl engaging lever 212 may be replaced by an arrangement as shown in Figure 23, consisting of a double pawl or anchor 233, such as used in watches, mounted on a pivot 234 and having an out of center spring 235. This arrangement further comprises a double ratchet sector with a double cam **208*b*** in its middle portion which operates the arrangement, as is well known in the art and therefore is not considered to require further explanation.

Returning now to the question of how the cage is operated and controlled during the return movement of the handle 22 or more particularly how each function control slide 171 returns to its start position, it will be understood that when the carriage 222 (see Figure 22) reaches its rear end position, that the cam actuating pin 231 has entered in contact with the lower cam projection 190″ of the cam plate 190 and pushed the latter upwardly along the guiding pins 195, whereby obviously the actuating surface 190′ (see also Figure 32) is also raised, which has the effect on its turn of raising the disengaging arm 182 which will rotate in counterclockwise direction about pivot 183 and thereby disengage the second plug 191 from the first plug 168 and the upper inclined surface 191′ will pass by the lower inclined surface 168′ whereby the function control slide 171 is disconnected from the function indicating rack column 167 and spring 192 will return the function control slide 171 to the position shown in Figure 18, that is to say, the start position, whereby the racks **93*b* or 93*c* are disengaged from the totalizing gears 99. At the same time tension spring 297′ will return cam plate 190** to the start position shown in Figure 18.

The arrangement is so timed that the disengaging operation of the second plug 191 from the first plug 168 takes place whilst the main operating handle 22 is still moving downwardly (counterclockwise direction) so that the cage will reassume its neutral position (see Figure 18) before the main handle 22 starts its return movement (clockwise direction).

Turning now to the operation of the main returner shaft 127, reference will be made to Figures 24, 25 and 26, wherein it may be seen that the carriage 222 besides the boring 225, tension spring 226 and projecting ear 230, comprises a coupling plate 236 swingably mounted on pivot 237 supported by said carriage 222, having at the front end and a boring 238, into which one end of a tension spring 239 is engaged, the other end of which engages pin 240 mounted on the carriage 222. A stop pin 241 mounted on the carriage 222 limits the clockwise movement of the coupling plate 236. Adjacent the pivot 237, that is to say in the rear end portion, the coupling plate 236 is provided with a coupling projection 242. Finally adjacent the front end portion, the coupling plate 236 is provided with a cam pin 243.

The main returner shaft 127 is rigidly mounted on the front end portion of a main returner shaft plate 244 the rear end portion of which is provided with a guiding pin 245 supported in a slot 424 (see Figure 48) of the central plate 29. Obviously in view of the fact, as previously explained, that the adding machine has two central plates 29 and two carriages 222, there are also two identical main returner shaft plates 244 which will parallelly guide the main returner shaft 127. As previously, the explanation will be prosecuted with regard to one of the main returner shaft plates 244, as shown in Figures 24 to 26.

Figure 24:
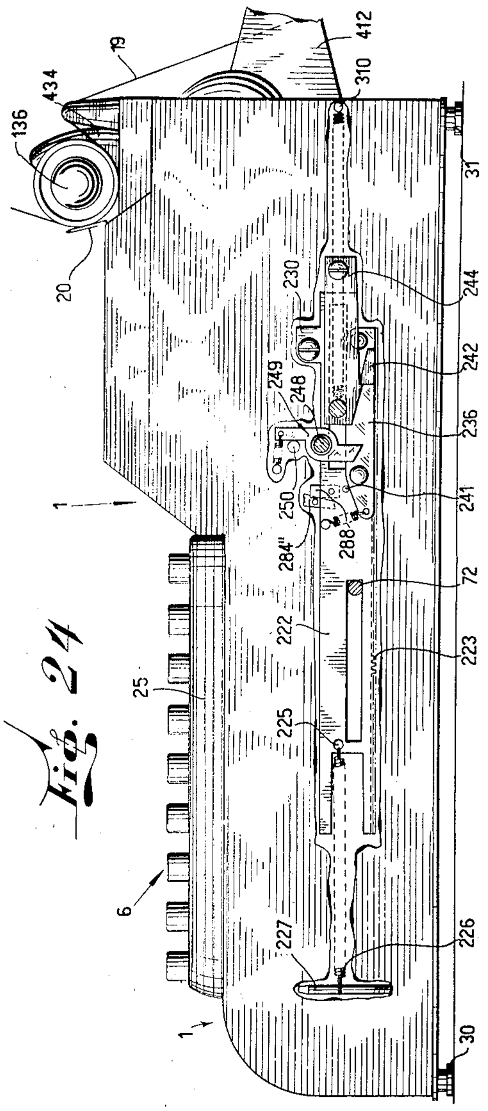
Figure 24 is a side elevation, partially in section of the adding machine, showing in particular the carriage and commanding means for the main returner shaft, in its inoperative position.
Figure 25:
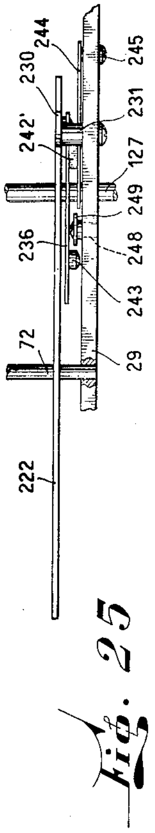
Figure 25 is a plan view of the mechanisms shown in Figure 24.

In the base portion of the front end portion of the main returner shaft plate 244, the former is provided with a recess 246 (see Figure 26), which may be engaged by the front end portion of the coupling projection 242, as shown in Figure 24. The main returner shaft 127 is connected to one end of a tension spring 247, the other end of which is connected to a spring supporting pin 310 (see Figure 48) mounted on the central plate 29.

The central plate 29 further supports by means of fulcrum 248 (see also Figure 48) a lever 249 having a lower arm 249′ and an upper arm 249″. The lower arm 249′ has an inclined cam surface **249*a* adapted to enter in operative relationship with cam pin 243, whilst the upper arm 249″ is adapted to enter in contact with stop pin 250 (see also Figure 48) which limits the counterclockwise rotation of the lever 249 and further comprises at its free end portion a boring 251 to which one end of a tension spring 252 is connected, the other end of which is connected to pin 253 (see Figure 48) mounted on the central plates 29**.

Upon operating the main handle 22, the gear sector 207 (see Figure 20) will drive the carriage 222 towards the rear end of the adding machine whereby the cam pin 243 (see Figure 24) will enter in contact with the inclined cam surface **249*c* (see Figure 26) and the coupling plate 236 will rotate in counterclockwise direction, whereby the coupling projection 242 will disengage the recess 246 and spring 247 will pull the main returner shaft plate 244 together with the main returner shaft 127 towards the rear end of the machine, thereby enabling all the transfer slides 76 (see for instance Figure 8) as well as the function control transfer slide 159 (see for instance Figure 18) to move, although it has to be recalled that the transfer slides 76 will not move until the respective pawls 85 will disengage the corresponding ratchet portions 84. The coupling projection 242 will disengage the recess 246 after the function control slide 171 has placed the cage in its correct position, in accordance with the command given by the operator to the function control column 7** (see Figure 1).

The operator will continue moving the main handle 22 in counterclockwise direction until reaching the lower end of its path, whereby the inclined surface 242′ will pass by the recess 246 until reengaging again the main returner shaft plate 244 bearing in mind that the length of the path of the main returner shaft plate 244 is shorter than that of the carriage 222 and associated parts, such as the coupling plates 236. It is evident to those skilled in the art, that as soon as the cam pin 243 has passed by the inclined cam surface **249*a* towards the rear end of the adding machine, that the tension spring 239 will rotate the coupling plate 236 in clockwise direction about its pivot 237 abutting pin 241 to reassume the position shown in Figure 24, whereby the inclined surface 242′ will enter in contact with the lower front end portion of the main returner shaft plate 244 until the engagement between recess 246 and coupling projection 242** is reestablished.

As soon as pawl 209 disengages the ratchet sector 208, as shown in Figure 22, the tension spring 226 will return the carriage 222 to its start position, as previously explained, and thereby also return the main returner shaft 127 to its start position and thereby return all the slides and like elements which are related thereto, to their respective start positions, such as for instance the transfer slides 76 and thereby the rack slides 66, the transfer levers 88 if one or several tens transfers had been carried out, the function control transfers slide 159 and its function control rack slide 144. Here again it can be pointed out that the required energy for the return movement may be provided by spring 226 or a spring connected to gear sector 207, as previously explained or the adding machine may be provided with both types of springs at the same time.

Shaft 220 which is to be considered the main shaft of the adding machine (see Figure 20) further supports (see Figure 27) a cam 254 having an increasing cam surface **254*a*, a constant maximum cam surface 254*b*, an instantaneous decreasing cam surface 254*c* and a constant minimum cam surface 254*d***.

Figures 27, 28, 44:
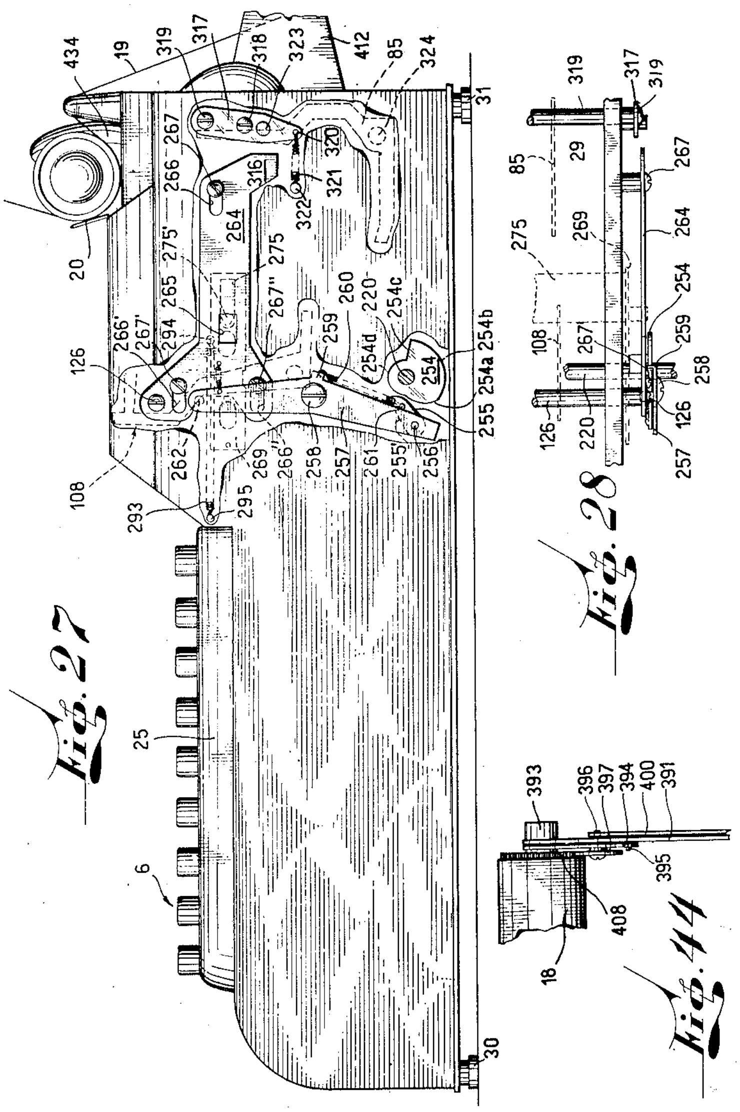
Figure 27 is a side elevation, partially in section of the adding machine, showing in particular the commanding plate and related mechanisms in inoperative position.
Figure 28 is a plan view of the mechanisms shown in Figure 27.
Figure 44 is a detail, in end view, of the paper supporting drum and related commanding mechanisms thereof.

Cam 254 is in operative relationship with cam follower 255 pivotally mounted by means of pivot 256 on the lower end portion of lever 257, having a fulcrum 258 supported by the outer face of the central plate 29 (see Figures 28 and 48). Lever 257 further comprises adjacent its fulcrum 258 and L-shaped projection 259 to which one end of tension spring 260 is connected the other end of which is connected to a pin support 261 connected to the cam follower 255. Pin support 261 also acts as a stop pin. The upper end portion of lever 257 is provided with a stub shaft 262 (see Figure 27) in contact with the recess 263 of commanding plate 264 having a rectangular window 265 and guiding slots 266, 266′ and 266″ through which bolts 267, 267′ and 267″, respectively, supported by the outer face of the central plate 29 (see Figure 48) pass and thereby guide during the backward and forward movement said commanding plate 264, as may already be understood by comparing Figures 27 and 29. Shaft 126 (already mentioned in connection with Figure 8) is supported by the upper front end portion of said commanding plate 264 and is connected to a similar commanding plate supported by the other central plate 29 and thereby transmits the movement thereto, inasmuch as said shaft 126 passes through suitable slots 425 (see Figure 48) of the central plates 29. Here again there are two identical commanding plates 264 for better commanding movement and reference will therefore be made only to the one shown in Figures 27 to 29. With regard to the remaining features of the commanding plate 264, these will be explained later on.

Figure 36:
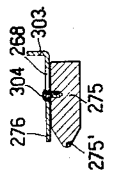
Figure 36 is a detail in longitudinal section of the mounting of the counter comb centering plate and the subtotal and total stop comb.
Figures 30, 32:
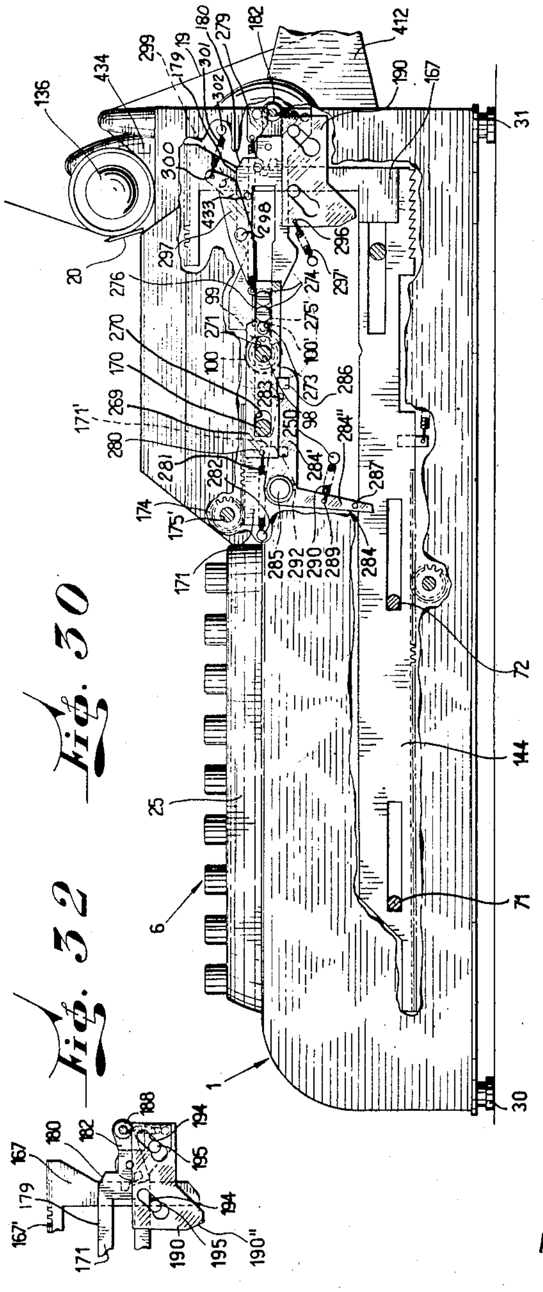
Figure 30 is a side elevation, partially in section of the adding machine, showing in particular the mechanisms relating to "subtotal" and "total."
Figure 32 is a detail in side elevation of the cam plate and related parts, when in operative position.
Figure 31:
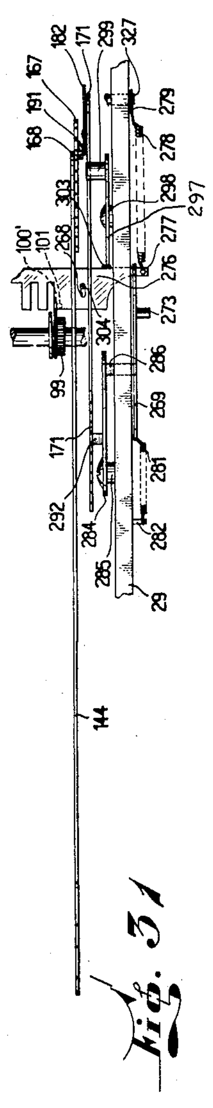
Figure 31 is a plan view of the mechanisms shown in Figure 30.

Turning now to Figures 30 and 31, it may be seen that the central plate 29 supports on its outer face a totalizing comb centering commanding plate 269 (here again one for each central plate 29) having guide slots 270 and 271 through which intermediate totalizer gear shaft 170 (on which is also mounted the intermediate totalizer gear 102, see Figures 8 to 12) and counter shaft 98, respectively, pass, for guiding said totalizing comb centering commanding plate 269 which at its rear portion comprises a driving pin 273 which enters the rectangular window 265 (see Figure 27). The rear portion of the totalizing comb centering commanding plate 269 supports by means of two screws 274 a totalizing comb centering plate 275 (see also Figure 18). On the top of said totalizing comb centering plate 275 a subtotalizer stop comb 276 (see Figures 30, 31 and 36) is slidably mounted (which will be later on more specifically described), having a projecting ear 277 passing through a slot 426 of central plate 29 (see Figure 48) and to which projecting ear 277 one end of a spring 278 is connected, the other end of which is connected to plate 279 mounted on shaft 327 (see Figure 31) passing through both central plates 29 and supporting on its other end a similar plate (279) (not visible) for a similar spring 278. The front end portion of the totalizing comb commanding plate 269 comprises a boring 280 to which one end of a tension spring 281 is connected, the other end of which is connected to pin 282 supported by central plate 29 (see Figure 48). Finally the totalizing comb centering commanding plate 269 comprises a recess 283 in the middle portion of its base edge.

An L-shaped lever 284 for controlling the return movement of the totalizing comb centering commanding plate 269 (that is to say towards the front end of the adding machine) is supported by fulcrum 285 on the inner face of the central plate 29 (see Figures 31 and 48). Here again a second similar L-shaped lever (not shown) is connected to the other central plate 29 and operates in identical manner. Said L-shaped lever 284 has a horizontal arm 284′ and a vertical arm 284″. The free end of the horizontal arm 284′ comprises a first blocking projection 286 passing through a window 427 (shown in Figure 48) of said central plate 29 to be able to enter in blocking contact with said recess 283 (see Figure 30). The vertical arm 284″ supports by its free end portion a stub shaft 287.

Returning now to Figure 24, it may be seen that the carriage 222 further comprises an upwardly projecting nose 266 adapted to enter in contact with said stub shaft 287. As may be best seen in Figure 30, the vertical arm 284″ has further in its middle portion a boring 289 to which one end of a tension spring 290 is connected, the other end of which engages stop pin 250 mounted on the central plate 29 (see also Figure 48) in such a way that spring 290 tends to rotate the L-shaped lever 284 in counterclockwise direction about its fulcrum 285.

The horizontal arm 284′ further supports a second blocking projection 292 mounted on the opposite face thereof with regard to said first blocking projection 286 (see Figure 31) and is destined to block the function control slide 171 when a subtotal is desired to be obtained, as will be later explained. To this end the function control slide 171 comprises a subtotal front wall 171′ (see Figure 18).

The totalizing comb centering plate 275 has tooth-like free end portions 275′ (see Figures 18, 19, 27, 29 and 30) which have to move in and out of the totalizing gears 99; more particularly when the tooth-like free end portions 275′ are meshing with the corresponding totalizing gears 99, the latter cannot rotate about the totalizing shaft 98 and at the same time are correctly centered so that it is assured that in the longitudinal opening 15 (see Figure 1) each totalizer drum 104 will correctly show the full number, or in other words it is practically not possible that one or more totalizer drums 104 do not place correctly the number to be indicated in front of the longitudinal opening 15.

On the other hand obviously, while the adding machine is carrying out an operation, the tooth-like free end portions 275′ must be withdrawn from the totalizing gears 99, in order to allow the totalizing gears 99 to rotate about totalizing shaft 98.

The control of the totalizing comb centering plate 275 is again automatically carried out by operating the main operating handle 22.

In fact upon rotating the main handle 22 in counterclockwise direction, the gear sector 207 (see Figure 20) will drive the main shaft 220 in clockwise direction and therewith the cam 254, the starting position of which is shown in Figure 27, and consequently the cam increasing surface 254*a* will gradually rotate the lever 257 about its fulcrum 258 in clockwise direction, until the cam follower 255 reaches the constant maximum cam surface 254*b*, in which instant the commanding plate 264 has completed its movement towards the rear end of the adding machine by means of the pushing action of stub shaft 262.

Figure 29:
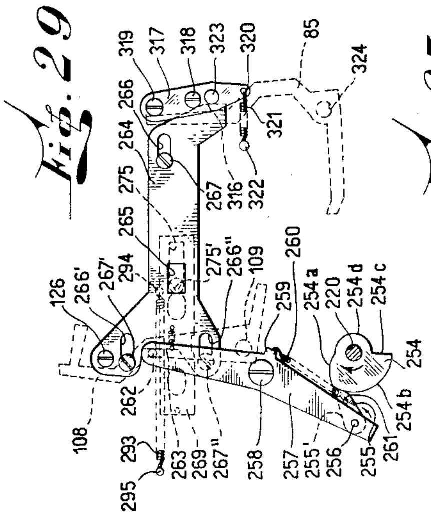
Figure 29 is a detail in side elevation of the mechanisms shown in Figure 27, and wherein the commanding plate is in operative position.

This backward movement of the commanding plate 264 is carried out approximately during the first third of the downward run of the main operating handle 22, whilst the second and third thereof correspond to the length of the arc of the constant maximum cam surface 254*b* where the commanding plate 264 is maintained in the position shown in Figure 29.

During the backward movement of the commanding plate 264 the rectangular window 265 thereof will drag along driving pin 273, therewith the totalizing comb centering commanding plate 269, so that when commanding plate 264 is in the position shown in Figure 29 the tooth like free end portion 275′ of the totalizing comb centering plate 275 are withdrawn from the totalizing gears 99 which may then rotate, that is to say whilst the cam follower 255 (see Figure 29) is contacting the constant maximum cam surface 254*b*. Unless the subtotal key 9 or total key 8 (see Figure 1) has been depressed, which event will be later described, the subtotalizer and totalizer stop comb 276 (see Figure 30) is occupying the same position as the totalizing comb centering plate 275.

Whilst the constant maximum cam surface 254*b* is in engagement with the cam follower 257, that is to say approximately during the last two third parts of the downward or counterclockwise travel of the main operating handle 22, the U-shaped totalizer operating racks 93 will carry out their operations as described in connection with Figures 8 to 12; as may already be visualized, during the first third part of the downward movement of the main operating handle 22 the function control slide 171 had the necessary time to arrange the cage in the correct position for the U-shaped totalizer operating racks 93, as described in connection with Figures 17, 18 and 19.

If the adding machine has been set for a subtotal operation, with which will be later more specifically dealt with, function control slide 171 will be moved along its maximum path towards the rear end of the adding machine, so that the cage position determining rollers 199 (see Figure 18) will face the "ST" portion of the substantially horizontal upper edge 175 of the function control slide 171, in which event the second blocking projection 292 (see Figure 30) will block the function control slide 171 by entering in blocking contact with the subtotal front wall 171′, for reasons which will be later explained, at the same time as the first blocking projection 286 enters recess 263 of the totalizing comb centering commanding plate 269.

As soon as the cam follower 255 passes by the instantaneous decreasing cam surface 254*c* and enters in contact with the constant minimum cam surface 254*d*, lever 257 will rotate in counterclockwise direction about fulcrum 258 and thereby the commanding plate 264 will return to its start position, as shown in Figure 27, due to spring 293 connected at one end to pin 294 mounted on the commanding plate 264 and at the other end to pin 295 mounted on central plate 29 (see Figure 48).

It may be anticipated already, that the adding machine is so timed that once the operations of the totalizing arrangement 97 is performed the carriages 222 will move from the rear end towards the front end of the adding machine and when the carriages 222 reach the front end position the projection noses 288 (see Figure 24) will enter in driving contact with stub shaft 287 of the vertical arm 284″ and thereby rotate the L-shaped lever 284 (see Figure 30) in clockwise direction about its fulcrum 285 and is thereby disconnected from the totalizing comb centering commanding plate 269 and the function control slide 171. As soon as a new operation is started the L-shaped lever 284 will again be urged by spring 290 in counterclockwise direction.

Figure 35:
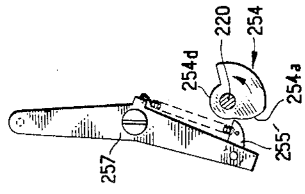
Figure 35 is a similar view as Figure 33, but showing the cam follower the moment it is returning to its start position.
Figure 34:
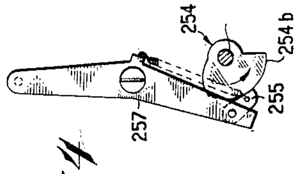
Figure 34 is a similar view as Figure 33, but showing the cam follower in contact with the constant maximum cam surface during the return movement of the cam.
Figure 33:
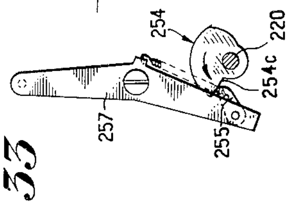
Figure 33 is a side elevation of the main shaft, its cam, the cam follower and lever when the cam is starting its return movement in counter-clockwise direction, when the cam follower is in contact with the instantaneous decreasing cam surface.

As to the cam follower 255 (see Figures 27 and 29), as soon as the main operating handle 22 starts its return or clockwise rotary movement, that is when said cam follower 255 is in contact with the constant minimum cam surface **254*d*, the cam 254 will start to rotate in counterclockwise direction, so that a moment will come in which the straight surface 255′ of the cam follower 255 will enter in contact with the instantaneous decreasing cam surface 254*c* and due to the further rotation of cam 254, the cam follower 255 will rotate in clockwise direction about its pivot 256 in opposition to tension spring 260, in order to finally reassume its original position, as shown in Figure 27, as soon as the cam follower 255 passes by the increasing cam surface 254*a* until reaching the constant minimum cam surface 254*d***, as fully shown in Figure 33 to 35.

Returning now once more to Figures 18, 30, 31 and 32, there has still to be described the subtotal and total stop comb commanding lever 297 which is pivotally mounted, by means of pivot 298, on the central plate 29, where said pivot is of reduced diameter (see Figure 48), and having at its rear end portion a roller 299 adapted to enter in contact with the inclined plane portion 180 of the function control slide 171 as well as with the rear portion of the substantially horizontal intermediate edge 179. A stop pin 433 (see also Figure 48) mounted on the center plate 29 limits the clockwise movement of lever 297.

A bore 300 also in the rear end portion of the subtotal and total stop comb commanding lever 297 enables to connect one end of a tension spring 301, the other end of which is connected to a pin 302 mounted on the central plate 29 (see Figure 48).

The subtotal and total stop comb 276 (see Figures 31 and 36) comprises a pair of parallelly arranged slots 268 (of which only one is visible) and upwardly rear end projecting ears 303 (only one visible).

A screw 304 passes through each of the slots 268 and are screwed into the totalizing comb centering plate 275. The upwardly rear end projecting ears 303 are adapted to enter in contact with the front end portion of the subtotal and total stop comb commanding lever 297.

Upon depressing the subtotal key 9 (see Figure 1), certain elements will be operated, as will be later described, it can however already be understood that the corresponding function control rack slides 144 and function indicating rack column 167 will be moved towards the rear end of the adding machine by means of the springs 165, whereby the function control slide 171, due to the first plug 168 which is in engagement with the second plug 191, will be moved towards its maximum rear position, so that the cage position determining rollers 199 (see Figure 18) will be located on the substantially horizontal upper edge 175 in the portion "ST." In this position, as also already previously explained, the second blocking projection 292 of the L-shaped lever 284 (see Figure 30) will enter in blocking contact with the subtotal front wall 171′. When the carriages 222 will start their movements towards the rear end of the adding machine, due to the operation of the main operating handle 22, as usual the cam actuating pin 231 (see Figures 21 and 22, for instance) will raise the cam plate 170 and thereby produce the disengagement of the second plug 191 from the first plug 168, as shown in Figure 32, without however allowing the function control slide 171 to return to its start position due to the blocking action of the second blocking projection 292.

Whilst previously the function control slide 171 was moved towards the rear end of the adding machine, the inclined plane portion 180 thereof has entered in contact with the roller 299 of the subtotal and total stop comb commanding lever 297 and consequently rotates said lever 297 in counterclockwise direction about its pivot 296 until adopting the position shown in Figures 30, where the free end of said lever 297 enters in contact with projecting ear 303 (see Figure 31) of the subtotal stop comb 276, so that during the movement towards the rear end of the totalizing comb centering commanding plate, the latter will move the totalizing comb centering plate 275 towards its rear end position and consequently disengage the totalizing gears 99, but the subtotal stop comb 276 will remain in its blocking position.

As can already be understood, the amounts charged in the adding machine, by previous operations, have located the different tens transfer disks 100 in corresponding positions, such as shown and explained in connection with Figure 12, for instance, and the U-shaped totalizer operating racks 93 will be located in such a way that the racks **93*c* will mesh with the totalizing gears 99, so that the amounts previously charged will be discharged until reaching the "zero" position whereupon the amounts stored in the machine during previous operations have been transferred to the printing mechanism 17 (see Figure 1), as will be later explained. In order to assure that all the totalizing gears will correctly reach their respective "zero" position, the subtotal and total stop comb is located in the path of the square teeth like projections 100′ of the tens transfer disks 100**, as previously explained.

Thereafter the U-shaped totalizer operating racks 93 will return to their start position, with the racks **93*a* meshing the totalizing gears 99 and thereby the previously charged amounts will be recharged into the machine, which is precisely a subtotal operation, as is known by those skilled in the art and only then the projecting nose 288 (see Figure 24) will disengage by means of stub shaft 287 and L-shaped lever 284 each function control slide 171, which will then return to their start position and thereby rearrange the cage into its neutral position, as shown in Figure 18, at the same time as subtotal stop comb commanding lever 297 will return to its normal position due to tension spring 301, whereby the subtotal and total stop comb is disengaged from said subtotal and total stop comb commanding lever 297, and when the commanding plate 269 returns upon declutching the first blocking projection 286, the totalizing comb centering plate 275** will again reassume the position shown in Figure 18.

If on the other hand a total taking operation is to be carried out, the same sequency of the first part of the operation will be performed, that is to say the inclined plane portion 180 of the function control slide 171 will raise the subtotal and total stop comb commanding plate and the projection 299 will finally rest on the substantially horizontal intermediate edge 179 at a portion directly adjacent said inclined plane portion 180 and consequently the front end portion of the subtotal and total stop comb commanding lever 297 will enter in contact with the upwardly rear end projecting ear 303, as previously described. The difference resides in the fact that, inasmuch as the function control slide 171 will not advance in its maximum extent towards the rear end of the adding machine, the second blocking projection 292 will not be able to enter in contact with subtotal front wall 171′, nor will the first blocking projection 286 enter recess 283, because projection 192 prevents it, consequently once all the square tooth like projections 100' have entered in contact with the subtotal and total stop comb 276 and the total amount has been marked on the printing mechanism 17, the function control slide 171 is free to return to its start position and thereby locate the cage in its neutral or zero position, whereby during the return movement of the U-shaped totalizer operating rack 93 towards the front end of the adding machine, the racks 93c will be out of mesh with the corresponding totalizing gears 99 and thus the machine remains "uncharged" and is ready for a completely new series of operation of any type.

Returning now to Figures 27 to 29, the remaining features of the commanding plate 264 will now be described. As already stated, the stop 126 is really a shaft (see also Figures 8, 11 and 12) and is destinated to return the second tens transfer lever 108 to its start position, as shown in Figures 8, 12 and 27 in case a transfer was performed, as shown in Figures 11 and 29. It may now be understood that each time the comanding plate 264 is displaced towards the rear end of the adding machine, as shown in Figures 29, the stop 126 unblocks the second tens transfer lever 108. During each return movement of the commanding plate 264, that is to say from the rear end towards the front end of the adding machine in case one or more of the second tens transfer levers 108 have oscillated in clockwise direction about the pivot 109, they will be reengaged with the first tens transfer lever 106 (see Figure 8).

The rear end portion 316 of commanding plate 264 is adapted to enter in driving contact with a pawl actuating arm 317 pivotally mounted on pivot 318 and supported by the central plate 29 (see Figures 28 and 48) and adjacent to the outer face thereof. A movement transmitting shaft 319 passes through a corresponding slot 428 of the central plate 29 and is connected to an identical pawl actuating arm (317) mounted on the other central plate 29 and not shown. The lower end portion of the pawl actuating arm 317 comprises a boring 320 to which one end of a tension spring 321 is connected, the other end of which is mounted on pin 322 supported by the central plate 29 (see also Figure 48). Said tension spring 321 tends to rotate the pawl actuating arm 317 in clockwise direction. A projecting pin 323 is mounted on said arm 317 between said pivot 318 and said boring 320. Said rear end portion 316 of said commanding plate 264 is adapted to enter in driving contact with said projecting pin 323 during the movement towards the rear end of the adding machine, whereby arm 317 will rotate in counterclockwise direction, as may be appreciated by comparing Figures 27 and 29, whereby the movement transmitting shaft 319 enters in contact with the upper arm of each pawl 85 and thereby said pawls 85 disengage their respective ratchet portions 84 of the transfer slides 76 (see Figure 8). All the pawls 85 are freely mounted on a common shaft 324 and each upper arm of each pawl comprises a boring 325 to which one end of a tension spring 326 is connected, the other end of which is connected to a shaft 327 supported by the two central plates 29, as already described (see Figure 48), which tension springs 326 tends to rotate the pawls 85 in clockwise direction and thereby as soon as the movement transmitting shaft 319 releases the pawls 85, that is to say during the return movement of the commanding plate 264, the pawls 85 will reengage the respective ratchet portions 84.

The details of the commanding means related to the function control column 7, still remain to be seen (see Figure 1) and in first instance reference will be made to the total key 8 and subtotal key 9 together with their special mechanisms, as previously mentioned.

As to the differences residing between the steps which are carried out by the adding machine when performing a totalizing operation and a subtotalizing operation, these have just above been described. Reference will now be made to Figure 37 and Figure 38, wherein again the total key 8 and subtotal key 9 and also the repetition key 12 and correction key 13 have been shown with their corresponding strip like key stems 305, 306, 138 and 309, respectively, already previously described. A commanding lever 328 is pivotally supported by shaft 72 which on its turn is supported by both side plates 28 (see Figure 2), and which commanding lever 328 (see also Figure 40) comprises a front end portion 328', an intermediate depression 328" at one side of shaft 72 and an upwardly projecting commanding arm 329 having a bracket 329' as its free end portion, at the other side of shaft 72. As may be appreciated in Figures 37 and 40, the front end portion 328' is adapted to be engaged by the projecting pin 154 of the total key 8 and the intermediate depression 328" is adapted to be engaged by the projecting pin 155, of the subtotal key 9. The relationship between the lever arm distance 72—328' and the vertical movement which either of pins 154 and 155 is capable of performing with regard to the commanding lever 328 is such that the arc which bracket 329' is capable of describing upon operation of either keys 9 or 8 is identical in both cases. That is why in the inoperative position, lever 328 (see Figure 37) is in contact with pin 154, whilst it is out of contact with pin 155, so that the subtotal key 9 will first carry out a first idle portion in its downward movement before entering in contact with the intermediate depression 328".

A bell crank lever 330 supported by shaft 331, passing through central plates 29 (see Figure 48) and which on its turn is supported by both side plates 28, comprises a vertical arm 334, a horizontal arm 332 and an oblique arm 333 (see also Figure 39). The vertical arm 334 supports an ordinal latching slide disengaging shaft 335 in contact with the rear end portions of the slidable ordinal latching slides 50. The opposite end of shaft 331 which is supported by the other side plate 28, as previously mentioned, rigidly supports a vertical arm (334, not shown) which is also connected to the ordinal latching slide disengaging shaft 335 passing through slots 430 of the central plates 29 (see also Figure 48). The free end portion of the horizontal arm 332 comprises a pivot connection 336 passing through a slot 337 of the front end portion 338' of the control lever 338. The rear end portion 338" of the control lever 338 comprises a downwardly projecting ear 339 and an upwardly projecting arcuate slotted guide 340, slidably mounted on the commanding shaft 24. The arcuate slotted guide 340 further comprises a rearwardly projecting spring support 341 having a boring 342, to which one end of a main control spring 343 is connected the other end of which is connected to pin 344 supported by the side plate 328 (not shown in Figure 37).

The downwardly projecting ear 339 pivotally supports by means of pivot 351 a bell crank lever 345 having a boring 346 on the end portion of one arm to which one end of a spring 347 is connected, the other end of which is also connected to boring 342 and thereby tends to rotate the bell crank lever 345 in counterclockwise direction. A stop pin 348 mounted on the rear end portion 338" limits the counterclockwise movement of said bell crank lever 345. The upper arm of the bell crank lever 345 comprises a first cam surface 349 and a second surface 350. Intermediate the front end portion 338' and the rear end portion 338" the control lever 338 is further provided with a fulcrum pin 352.

The oblique arm 333 of the bell crank lever 330 is in operative relationship with the correction projecting pin 153 of the key 13.

The bell crank lever 330 (see Figure 51) further comprises a declutching projecting arm 435, projecting towards the front end of the adding machine and located above and spaced apart from the oblique arm 333. The front end portion of said declutching projecting arm 435 is connected to the declutching projecting arm of the other bell crank lever (not shown) by means of a declutching shaft 436.

Each clutching lever 134 comprises an inclined declutching rear projecting surface 437 integral with the horizontal arm 134*a* of the clutching lever 134 which also comprises a vertical arm 134*b*, the free end of which is adapted to enter in blocking contact with pin 438 mounted on the carriage 222. A bore 439 in said vertical arm 134*b* enables to engage one end of a tension spring 440 the other end of which is connected to projection 441 supported by one of the comb-like guides 420 (not shown in Figure 14).

Figure 40:
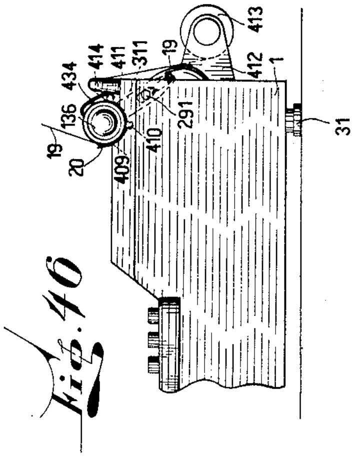
Figure 40 is a detail in side elevation, showing the total key, subtotal key and correction key and related mechanism similar as Figure 37, but in operative position.

Upon depressing either the total key 8 or the subtotal key 9 and thereby moving towards the front end the function control latching slide 139 (see Figure 15) and engaging the corresponding pin 304 with the upper shoulder 45 of the cam detent 39 (see Figure 3), the commanding lever 328 will rotate in counterclockwise direction, as shown in Figure 40 (wherein, in order to avoid to show three separate figures, the total key 8, the subtotal key 9 and the correction key 13 are shown in depressed position, although obviously only one key will be depressed in each specific operation) and thereby the bracket 329' will raise the front end portion 338' of control lever 338 and rotate the bell crank lever 330 in counterclockwise direction about shaft 331 and consequently push all slidable ordinal latching slides 50 (see Figure 39) towards the front end of the adding machine, thereby disengaging all the L-shaped zero stop pawls 57 and thus enabling the adding machine to discharge the previously stored amounts in the totalizing arrangement 97 and obtain either the "subtotal" or "total," in accordance with what is desired by the operator.

If on the other hand the correction key 13 is depressed then its projecting pin 153 will directly operate the bell crank lever 330 in a manner similar as previously described, whereby all the slidable ordinal latching slides 50 are pushed by ordinal latching slide disengaging shaft 335 towards the front end of the adding machine and thus the incorrectly depressed keys 6 will rise due to their respective helical compression springs 47 (see Figure 3) in view of the fact that the corresponding pins 55 will disengage the respective upper shoulders 45 of the cam detents 39.

It has to be pointed out that during a "correction" operation, even if momentaneously the L-shaped zero stop pawls 57 will disengage the rack slides 66, nothing will happen, inasmuch as the pawls 85 are engaged with their corresponding ratchet portions 84, so that as soon as the keys 6 are raised together with the correction key 13 the L-shaped zero stop pawls 57 will reengage the corresponding recesses 74 of the rack slides 66.

When describing the operation of the keyboard 4, it was not possible to describe then, in order to avoid the introduction of too many mechanisms at the beginning, how at the end of each operation the depressed keys 6 of the keyboard 4 are returned to their inoperative positions.

Upon operating the main operating handle 22 in counterclockwise direction and thereby rotating in the same direction the operating shaft 24, the latter will rotate therewith a keyboard disengaging cam 353 (see Figure 37, wherein the start position is shown) which will first enter in contact with the first cam surface 349 thereby rotating the bell crank lever 345 in clockwise direction until entering in contact with the second cam surface 350 and then due to spring 347, the bell crank lever 345 will return to its start position entering in contact with the stop pin 348. When the main operating handle 22 returns towards the start position (clockwise rotation), the keyboard disengaging cam 353 will first enter in contact with the second cam surface 350 and inasmuch as stop pin 348 stops the bellcrank lever 345 from further rotating in counterclockwise direction, the keyboard disengaging cam 353 will gradually push down in clockwise direction the control lever 338 about the fulcrum 352, which is in supporting contact with the vertical arm 354 of the repetition disengaging bell crank lever 355 (which will be later described) and during which rotation the control lever 338 is guided by its arcuated slotted guide 340. This clockwise rotation of the control lever 338 will rise the front end portion 338' (see Figure 40) and thereby rotate in counterclockwise direction the bell crank lever 330 which will operate the ordinal latching slide disengaging shaft 335, as previously described and thereby disengage all the keys 6, previously depressed. As soon as the keyboard disengaging cam 353 enters in contact during its return movement with the first cam surface 349, the control lever 338 will rotate about its fulcrum pin 352 in counterclockwise direction due to the main control spring 343.

Returning now once more to Figure 51, it may be understood that as soon as the main operating handle 22 starts its counterclockwise operation, the carriage 222 will move towards the rear end of the machine and thereby the pin 438 will disengage the clutching lever 134 which due to tension spring 440 will oscillate in counterclockwise direction about commanding pivot 135 and thereby the clutching end 134' of each clutching lever 134 will either enter the recess 132 or 133, as previously described, so that the keyboard 4 is blocked.

Figure 51:
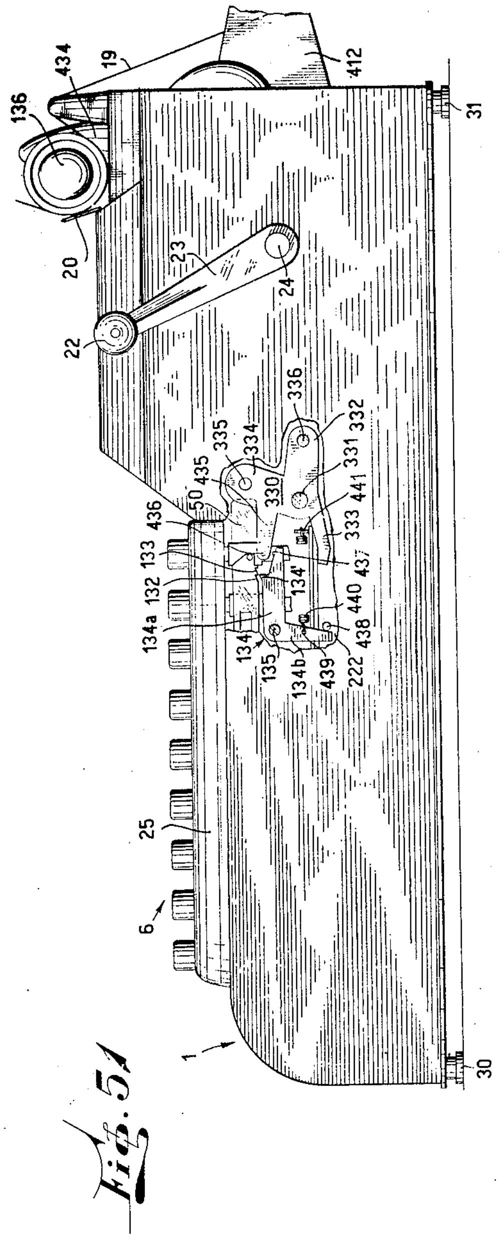
Figure 51 is a side elevation, partially in section, of the adding machine, showing in particular the mechanism of the clutching lever for the ordinal latching slides.

Before the ordinal latching slide disengaging shaft 335 starts to push the ordinal latching slide 50 towards the front end of the machine, as above described, the clutching lever 134 must obviously disengage each ordinal latching slide 50 and to this end the declutching shaft 436 is so arranged that it will enter in contact with the declutching rear projecting surface 437 in due time, whereby clutching lever 134 will swing about pivot 135 in clockwise direction before the ordinal latching slide disengaging shaft 335 enters in contact with the ordinal latching slides 50, wehreby the clutching ends 134' are withdrawn, and before the main operating handle 22 reaches its start position, the pin 438 has already reengaged the free end of vertical arm 134*b* and thereby the position shown in Figure 51 is reassumed.

Bearing in mind the above description of the operation of the keyboard disengaging cam 353 and related parts, the means to make it possible to carry out a repetition, by preventing the automatic raising of the previously depressed keys 6 are raised, are still to be described.

Figures 40, 41:
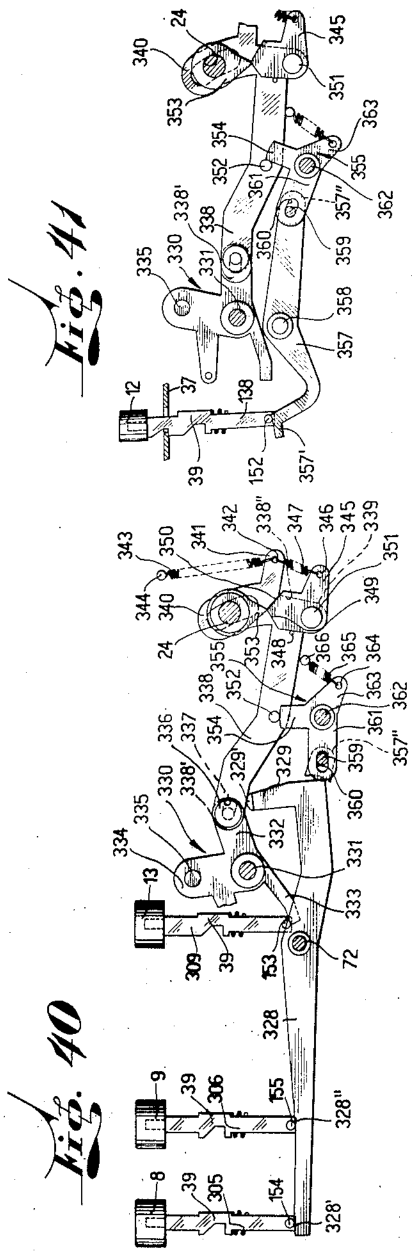
Figure 41 is a detail in side elevation showing the repetition key and related mechanism, similar as in Figure 37, but in operative position.

The key stem 138 of the repetition key 12, besides cam detent 39 (see Figures 37 and 41) comprises a recess 356, similar to recess 40, arranged between the digit cap and the cam detent 39. This recess 356 serves to lock the repetition key 12 in its depressed position in the upper guide plate 37, as is already known; more particularly in order to lock the repetition key as above stated, it is necessary first to push the key 12 downwardly and then towards the front end of the adding machine. In order to unlock the key 12, it is merely necessary to push it towards the rear end, whereby the recess 356 disengages the upper guide plate 37 and the spring 47 rises the repetition key to its inoperative position.

The projecting pin 152 of the repetition key 12 is adapted to engage the front end portion 357' of the repetition lever 357 pivoted on pivot 358, mounted on the side plate 28. The rear end portion 357'' of the repetition lever 357 comprises a pin 359 slidably engaging slot 360 of the horizontal arm 361 of the repetition disengaging bell crank lever 355 mounted on pivot 362 supported by the side plate 28. The oblique arm 363 comprises a boring 364 to which one end of a spring 365 is engaged the other end of which is engaged to a spring supporting pin 366 mounted on the side plate 28 and tending to rotate the repetition disengaging bell crank lever 355 in counterclockwise direction. It has to be added that the rotation of the bell crank lever 355 produced by spring 365 is limited by pin 152 through its connection with lever 357 (see Figure 37).

If a "repetition" is desired, it is necessary to avoid that the ordinal latching slide disengaging shaft 335 will operate the slidable ordinal latching slides 50, to which end the repetition key 12 is depressed, as previously explained (see Figure 41), whereby the repetition lever 357 will rotate in counterclockwise direction and raise the rear end portion 357'', whereby the repetition disengaging bell crank lever 355 will rotate in clockwise direction and vertical arm 354 will disengage the fulcrum pin 352. Consequently, during the return movement (in clockwise direction) of the operating shaft 24, the control lever 338 will freely oscillate about the pivot connection 336, inasmuch as the fulcrum pin 352 is out of engagement with the vertical arm 354 and consequently the bell crank lever 330 and ordinal latching slide disengaging shaft 335 are not operated.

It has still to be added that the function control latching slide 139 is of smaller length than the ordinal latching slides 50 so that upon operating either the total key 8 or subtotal key 9, the ordinal latching slide disengagnig shaft 335 does not disengage the keys 8 and 9, but it will disengage the keys 6 which might have been depressed by mistake.

On the other hand the disengaging stroke of shaft 335 will be sufficient to push also the functional control latching slide 139 towards the front end of the machine, upon operating the correction key 13 or when the key-board disengaging cam 353 mounted on shaft 24 carries out its disengaging operation, as previously described.

So far it has already been seen how the adding machine is operated and how the different mechanisms constituting the adding machine work inclusive how each result is shown on the totalizer 16, but it has not yet been described how the results of each operation is printed on the paper 19 (see Figure 1), more particularly the printing mechanism 17.

To this end reference will now be made to Figures 42 to 46. Each transfer slide 76 which has already been described in connection with Figure 8, supports on the face opposite to that supporting the transfer lever 88, a rack column 367 of similar structure as the function indicating rack column 167 (see Figure 18). Each rack column 367 comprises a front slot 368 and a rear slot 369 through which corresponding guiding pins 370 and 371, respectively, pass and which guiding pins are supported by said rack slides 76. In order to simplify the description, reference will now be made only to a single rack slide 76 and rack column 367 although it is understood that each column or bank 5 has one of these arrangements.

In view of guiding pins 370 and 371, the rack column 367 is capable of sliding along the transfer slide 76, as will be later explained. The upper end portion of the rack column 367 includes a rack 367' meshing with a printing gear 372 loosely mounted on a shaft 373 (see also Figure 48), common to all the printing gears and supported between the central plates 29 (only one visible in Figure 43). Each printing gear 372 is integral with a printing roller 374 (see also Figure 42) and comprises eleven different printing positions; more particularly the numbers zero, one to nine and a blank position.

As previously described, the transfer slide 76 comprises a slot 128 through which the main returner shaft 127 passes. Consequently it is necessary that also the rack column 367 comprises a slot 375, substantially indentical to slot 128. The front end portion of the rack column 367 comprises a projecting ear 367'' having a bore 376 to which one end of a spring 377 is connected, the other end of which is connected to bore 378 of the transfer slide 76. By comparing Figures 8 and 42 it may be seen that spring 377 is located below spring 92 and that is why the cutout portion 76'' is relatively large. Spring 377 tends to move the rack column 367 towards the rear end of the transfer slide 76. The rack column 367 further comprises an upwardly projecting nose 379 adjacent slot 375 and having a vertical rear face 379' and an inclined front face 379''.

The transfer slide 76 comprises a rack column commanding cutout portion 380 adjacent the front end of slot 128 and conveniently the rack column 376 is also provided with such a cutout portion which is adjacent the inclined front face, so that when slots 128 and 375 coincide, the cutout portion 380 will likewise coincide with the cutout portion of the rack column 376.

A zero blocking pawl 381 is pivotally mounted on shaft 382 (see also Figure 48) supported between the central plates 29. Each zero blocking pawl 381 comprises a vertical arm 383 having a boring 384 to which one end of a spring 385 is connected, the other end of which is connected to stop pin 250, which has already been described in connection with the lever 249 (see Figure 24). This stop pin 250 is again a pin which is supported at its respective ends by the central plates 29 (see Figure 48). Spring 385 (see Figure 42) tends to rotate the zero blocking pawl 381 in clockwise direction. The zero blocking pawl 381 further comprises a horizontal arm 386 having a rack column commanding projection 387 adapted to enter the rack column commanding cutout portion 380. Consequently it may already be understood that at least this portion of the zero blocking pawl 381 is located above and aligned with the transfer slide 76. However in view of the fact that the space existing between the transfer slide 76, and the rack column 367 is rather small, it is convenient to provide, as previously stated, also the rack column 367 with a similar cutout portion. The front portion 386' of the horizontal arm 386 which corresponds to the rear portion of the adding machine is slightly laterally bent, so that the projecting nose engaging portion 388 is capable of engaging the projecting nose 379, since the vertical face **386*a* enters in engaging contact with the vertical rear face 379'. The front portion 386' comprises a further laterally inclined projection 386'' (see also Figure 43), the front end of which is adapted to rest on the upper edge of the next adjacent zero blocking pawl 381 and more particularly, on the inclined front portion 1386'** (see Figure 43).

It is obvious that instead of providing the zero blocking pawl 381, a different device may be used for carrying out the same function. For example all the bending of said hook 381 could be avoided if a hook of larger width is provided so that it will be located both above the rack pawl 76 and the rack column 367, whereby the bending of the front portion 386' is avoided.

The further laterally inclined projection 386'' may be replaced by two oppositely projecting pins supported by hook 381 and located at different heights, so that a superposition and clutching effect, similar to that above described is obtained.

The operating shaft 24 which is supported by the central plate 29, as already described, further supports an eccentric 389 adapted to enter in driving contact with the cam follower 390, controllably mounted on the lower end of drum carrier lever pivotally mounted on shaft 392 (see also Figure 48) supported between the central plates 29 and supporting on its other end a similar drum carrier lever 391, but only the upper portion thereof (not shown). The upper end of the drum carrier lever 391 supports a drum carrier shaft 393 for drum 18. The drum carrier shaft 393 further loosely supports a downwardly projecting lever 394 having a pin 395 and a projecting pivot 396, on which a pawl 397 is pivotally mounted, having a pawl actuating end 397' and a free end 397'' having a boring 398 to which one end of a spring 399 is connected, the other end of which is connected to pin 395, so that the pawl 397 tends to rotate in clockwise direction. The projecting pivot 396 is further engaged by a fork lever 400, pivotally supported by pivot 401, mounted on central plate 29 (see also Figure 48) and having intermediate its end a longitudinal slot 402 engaging a pin 403 mounted on the lower arm of the drum carrier lever 391, that is to say between the cam follower 390 and the shaft 392. The lower arm of the drum carrier lever 391 further comprises an ear 404, with a boring 405, to which one end of a spring 406 is engaged, the other end of which is hooked to a pin 407 mounted on the cam follower 390, so that the latter tends to rotate in clockwise direction, and said pin 407 limits this movement, inasmuch as it operates as a stop pin.

The pawl actuating end 397′ is in operative relationship with a ratchet wheel 408 integral with the drum 18. The lower portion of drum 18 (see Figure 46) is surrounded by a paper guide 409 having the usual bottom roller 410 and rear roller 411. The paper guide 409 is elastically supported by spring urged projection 311, guided by pin 291. A bracket 412 supports a paper roll 413 which supplies the necessary paper strip 19. The bracket 412 is supported by the casing 1 and the paper is suitably guided towards the rear roller 411 over guiding roller 414. Finally, the usual type of ribbon 415 (see Figure 42) passes in front of the paper 19 and between printing rollers 374 and the paper 19, which on its turn is in driving contact with drum 18, due to bottom roller 410 and rear roller 411.

A stop arm 434 having a roller (not shown) also meshes with ratchet wheel 408 to avoid idle rotation of drum 18. Finally, a spring 416 is connected to the lower end of the drum carrier lever 391 and a pin 417 coaxially mounted on the end portion of intermediate totalizer gear shaft 170, as already described in connection with Figure 12.

As to the operation of the printing mechanism 17, as soon as the transfer slides 76 are moved towards the rear end of the machine, the rack column commanding cut-out portion 380 will raise the rack column commanding projection 387 and thereby swing the zero blocking pawl 387 in counterclockwise direction about its shaft 382, whereby the hook will disengage the projecting nose engaging portion 388 (see Figure 45) and spring 377 will slide the rack column 367 along the transfer pawl 76 until the end of rear slot 369 enters in contact with the guiding pin 371, which magnitude equals to one eleventh of a complete turn of the printing roller 374 which will be moved from the blank position to the zero position and thereafter the rotation continues in accordance with the previously given command.

Assuming that for instance the amount of $500.00 is desired to be charged into the adding machine, the digit 5 "five" of the hundred column is depressed and automatically when printed on the paper the four zeros at the right of the five, that is to say those corresponding to the column of the tens, units and fractions should appear whilst the columns corresponding to the thousands and higher values should remain in blank. To this end the arrangement of the front portion 386′ and further laterally inclined projections 386″ is provided. As has already been explained, for example the further laterally inclined projection 386″ of the column corresponding to the ten is resting on the upper edge 1386′ of the front portion 386′ of the zero blocking pawl 381 of the tens and similarly the further laterally inclined projection 386′ of the tens is resting on the upper edge 1386′ of the front portion 386′ of the hundreds, so that upon raising the zero blocking pawl 381 corresponding to the column of the hundreds automatically the lower columns are raised and consequently the corresponding printing rollers 374 will be moved from the blank position to the zero position, while the printing rollers 374 of the columns of the higher values will remain in the blank position.

If the adding machine is intended for monetary use, then it is convenient to provide only the columns corresponding to the ten and higher values with the above described arrangement, that is to say the projecting nose 379 and zero blocking hook 381, while the lower value columns will not be provided with these means, so that as soon as the main returner shaft 127 is displaced towards the rear end of the adding machine, automatically these three rack columns 367 are displaced relatively to their transfer slides 76 and the printing rollers 374 will automatically pass to the zero position.

Whilst the operating shaft 24 continues its rotary movement in counterclockwise direction, the eccentric 389 will gradually push the cam follower 390 towards the rear end of the machine (see Figure 45) thereby inclining the drum 18 towards the printing rollers 374 and finally print the figures onto the paper 19. It has here to be added that obviously the arrangement is so timed that the printing is only carried out, once all the transfer slides 76 have completed their respective movements towards the rear end of the machine and thereby also the printing rollers 374 are in the correct position. Obviously inasmuch as the ribbon 450 is arranged between the paper 19 and the printing rollers 374, the printing will be suitably coloured, as it is already well known in the art.

During this counterclockwise rotation of drum 18, the pawl actuating end 397′ has been dragged one ratchet tooth backward, so that when the drum carrier lever 391 will spring in clockwise direction, the pawl 397 will rotate the drum 18 in clockwise direction to the extent of one line. To this end the fork lever 400 is suitably guided by pin 403 and slot 402, as well as the pawl is indirectly suitably guided by projecting pivot 396.

Inasmuch as the cam follower 390 is pivotally mounted on pivot 418 and urged by spring 406, it is capable of reestablishing its start position once the eccentric 389 has completed its return movement in clockwise direction.

Figure 47:
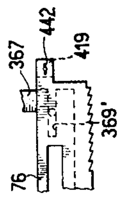
Figure 47 is a detail, in side elevation, of the rear end of a transfer slide and rack column, according to a modified embodiment.

In view of the fact that it is rather difficult to mount the rack column 367 on the transfer slide 76 with the arrangement as described, it may be convenient to provide a longer rear slot 369′ (see Figure 47) in which event the rear end of the transfer slide 76 is provided with a stop block 419, with which the rear end of the rack column 367 is adapted to enter in contact, upon releasing the projecting nose 379.

The stop block 419 is controllably mounted on slot 442 which evidently facilitates the alinement of the printing rollers 374.

In either event, during the return movement of the main returner shaft 127 towards the front end of the adding machine, it will push the front end defining the slot 375 of the rack column 367 until the vertical face **386*a* will engage the vertical rear face 379′ and spring 385** will cooperate therewith.

It will be obvious to those skilled in the art, that it is also possible to invert the arrangement in such a way that the printing rollers will move towards the drum instead of the drum moving towards the printing rollers.

Although the embodiment described is suitable for a machine, obviously this does not mean that it is the only possible solution. Thus for instance, the rack columns 367 may be completely substituted and more particularly it would be possible to add a slidable rack on each upper branch 88′ (see Figure 8) of the transfer levers 88. In this event the zero blocking pawl 381 for each rack would have to be mounted on the corresponding upper portion and the operation thereof would be carried out by means of a shaft operated by the same mechanism which controls the main returner shaft 127.

Instead of using the printing rollers 374, the well known printing racks which are displaced along a vertical line may be used as well.

Finally both in the event when printing rollers are used as well as when printing racks are employed, the printing effect by compression, that is to say with slow movement as above described, may be replaced by an impact printing mechanism which has the advantage that the printing may be carried out on the paper as such in the place and height as would be suitable, so that a good visibility is obtained. In this event it would be more advisable that the printing elements will move and the paper supporting drum will remain stationary. Since the arrangement of the driving mechanism for the ribbon 415 is well known in the art, it is not considered necessary to further describe or illustrate the latter.

Although the operation of the different mechanism constituting the adding machine has been described together with the structural description it is considered advisable to briefly describe for instance a complete adding operation, so that the functional relationship existing between the different mechanism and the synchronization thereof will be also apparent to those which are not so skilled in this particular art.

If an adding operation is to be carried out no key has to be depressed in the function control column 7 (see Figure 1) and the different keys 6 of the different columns or banks 5 of the keyboard 4 have to be depressed in accordance with the amount to be charged into the adding machine. By depressing any of the nine keys in any of the columns 5, the free end 56' (see Figure 3) of the corresponding slidably ordinal latching slide 50 will oscillate the L-shaped zero stop pawl 57, whereby the hooked end 62 will disengage the recess 74 of the corresponding rack slide 66.

Figure 26:
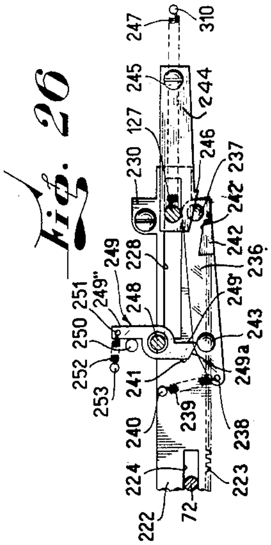
Figure 26 is a detail in side elevation of the mechanisms shown in Figure 24 and corresponding to the position in which the main returner shaft has just been declutched.

Once all the desired keys 6 have been marked on the keyboard 4, the operator starts to operate in counterclockwise direction the main operating handle 22, thereby rotating in the same direction shaft 24 and indirectly gear sector 207 (see Figure 20), which transmits the movement to gear 219, which on its turn transmits this movement to the carriages 222 which start to move towards the rear end of the machine thereby releasing the clutching lever 134 and the L-shaped lever 284 and immediately thereafter lever 249 (see Figure 24) disengages the main returner shaft plate 244 and its main returner shaft 127, which quickly slides towards the rear end of the machine as shown in Figure 26, which enables the function control rack slide 144 (see Figure 15) to move towards the rear end, due to spring 165 (see Figure 16), and gear arrangement 156—158 until the hooked end 143 of L-shaped stop pawl 141 engages the projection 145' (see Figure 15). During the movement of the function control transfer slide 159 (see Figures 16 to 18) towards the rear end of the adding machine, the first plug 168 and the second plug 191 which are in engagement will drag the function control slide 171 towards the correct position, for instance the adding position A. As a consequence, the case will be arranged in such a position that the racks **93*b* (see Figure 12) will mesh with the totalizing gears 99**.

At the same time the cam 254 (see Figure 27) will start to move the commanding plate 264 towards the rear end of the adding machine, whereby stop shaft 126 (see also Figures 8 to 12) is moved towards its rear end position so that the first tens transfer lever 106 and the second tens transfer lever 108 are free to operate if so commanded.

As the commanding plate 264 continues its movement towards the rear end of the adding machine, the tooth like free end portion 275' of the counter comb centering plate 275 is withdrawn from the totalizing gears 99 at the same time as also the subtotal and total stop comb 276 (see Figure 30) is withdrawn.

Finally before the commanding plate 264 finishes its movement towards the rear end of the adding machine, the rear end portion 316 (see Figure 29) oscillates the pawl actuating arm 317, which on its turn will disengage the pawl 85, so that each transfer slide 76, due to springs 82, will start its movement towards the rear end of the adding machine, which movement is transmitted through the gear arrangement 68, 169, 78 to the rack slides 67 which are controlled in their movement by pins 73 and free end 36' (see Figure 3).

At the same time the transfer slides 76 will move the U-shaped totalizer operating racks 93 towards the rear end due to the transfer levers 88 and thereby the totalizing gears 99 are rotated and eventually the projecting pins 101 will carry out a tens transfer.

Also at the same time whilst the transfer slides 76 move towards the rear end of the adding machine, the printing mechanism (see Figure 42) is operated, more particularly the rack column commanding cut out portion 300 rises the zero blocking pawls 381, whereby the printing rollers 374 will rotate from their blank positions to their zero positions and thereafter they will continue to the marked position and the lower denominational orders, if not operated on the keyboard 4, are operated by the further laterally inclined projection 386''. While the transfer slides 76 continue their movements towards the rear end, the racks 367' will rotate the printing rollers 374 to their correct position and at the same time also the correct position or amount is shown on the totalizer 16 (see Figure 1).

When these operations have been performed, the eccentric 389 (see Figures 42 and 45) starts to operate the cam follower 390 and the printing is carried out on the paper 19.

Prior to starting the printing the commanding plate 264 (see Figure 27) carries out its return movement towards the front end of the machine, thereby first disengaging pawls 85 which will mesh with the ratchet portion 84 (see Figure 8), which has nine teeth and therefore they will maintain in any of the nine positions the transfer slides 76, at the same time as the totalizing comb centering plate 275 will mesh again with the totalizing gears 99 and when the commanding plate 264, is about to finish its return movement, the stop shaft 126 will rotate in counterclockwise direction the second tens transfer lever 108, in case a transfer was carried out and thereby enable spring 122 (see Figure 8) to reengage the upper projection 108' with the short arm 106''.

In the meantime the carriage 222 carries out its movement towards the rear end of the adding machine, whereby its cam actuating pin 231 will enter in contact with the lower cam projection 190'' (see Figures 22 and 32), thereby raising cam plate 190 and disengaging the second plug 191 from the first plug 168 (see Figure 18), so that the function control slides 171 will return to their neutral position and therewith the cage to position N. This corresponds to the rear end position of carriage 222 and to the end of the counterclockwise rotation of the main operating handle 22, in which instant the pawl 209 is disengaged (see Figure 20) or its equivalent 233 (see Figure 23), so that the main operating handle 22 may return towards its start position, due to spring 226 (see Figure 20), which operates on carriages 222, which will also return.

During the return movement of the carriage 222, the coupling projection 242 (see Figure 24) couples recess 246 of the main returner shaft plate 244 and thereby the main returner shaft or as may be also called "main restoring shaft" 127 will start its return movement and when this return movement is almost completed, the ordinal latching slide disengaging shaft 335 (see Figure 39) will disengage the slidable ordinal latching slides 50 at the same time as the clutching levers 134 and when the carriage 222 reaches its front end position, the projecting nose 288 (see Figure 24) will disengage the L-shaped lever 284 and in the event of a subtotal the totalizing comb centering commanding plate 269 (see Figure 30), whereby, in this event the totalizing comb centering plate 275 will mesh again the totalizing gears 99.

If a subtracting operation is to be carried out, the sequency of the steps is similar to the above described, with the main difference that the L-shaped stop pawl 141 (see Figure 18) is counterclockwise oscillated about its shaft 58 and disengages the function control rack slide 144, so that the function control slides 171 will drive the racks **93*c*, through the cage into mesh with the totalizing gears 99**.

When a subtotal or total is desired to be obtained, the main additional difference resides in the operation of the subtotal and total stop comb commanding lever 297 (see Figure 30) and related parts, as already previously explained.

In view of the previous explanations, it may now be described why the ratchet portions 84 have nine teeth. In case a total is to be obtained, it has already been explained that when the carriage 222 reaches the rear end position and thereby disengages the function control slide 171, that the commanding plate 264 has performed the necessary movement for clutching, by means of the comb plate 275, the totalizing gears 99. In view of the fact that in an operation for a total, the return movement of the U-shaped totalizer operating racks 93 is a free movement, that is to say that these totalizer operating racks return without meshing with the totalizing gears 99, a danger would exist in that in the instant the racks 93c are disengaged from the totalizing gears 99, that the transfer slides 76 remain free and will be displaced with high speed towards the rear end of the machine, due to the tension of springs 82, until the front ends of slots 79 and 80 enter in abuting contact with the supporting shafts 71 and 72. This is avoided by means of the pawls 85, as previously described, which in the instant the commanding plate 264 moves towards the front end of the machine clutch the ratchet portions 84.

As has already also been explained, the front portions of the slots 69, 70, 79 and 80 of the rack slides and transfer slides, respectively, determine the maximum stroke of said slides, so that the ratchet portions 84 require only nine teeth instead of ten.

With regard to the operation of repetition and correction, these operations have been fully described, when describing the mechanism and therefore do not require any additional comments.

Finally if a non-adding operation is to be carried out, the non-adding key 10 must be depressed (see Figures 1 and 15), whereby the free end 140' will oscillate the L-shaped stop pawl 141, which will disengage the function control rack slide 144, which in spite of it will not move towards the rear end of the machine, because the non-adding stop pin 151 directly enters in contact with the non-adding strip like key stem 307. Thus, the function control transfer slide 159 and the function indicating rack column 167 (see Figure 18) will maintain the cage in its neutral position and the amount marked on the keyboard 4 will be printed on the paper 19 without being charged into the machine, or more specifically into the totalizing arrangement 97 (see Figure 8), but a suitable sign will indicate on the paper that the amount has not been stored in the machine.

Whilst the listing adding machine of the present invention has been fully described, it is obvious that the arrangements of the different mechanisms may be differently disposed and yet the same result obtained, so that these obvious modifications are not specifically described since they are within the normal resources of those skilled in the art.

For instance it would be possible to use a single central function control slide 171 instead of two lateral function control slides or some of the rack slides would result unnecessary if the transfer slides were to be arranged directly below the corresponding ordinal latching slides.

It has already been pointed out at the beginning of this description that it may be advisable to vary the length of the operating lever 23, in order to vary the power which is supplied to the main operating handle 22.

Figure 52:
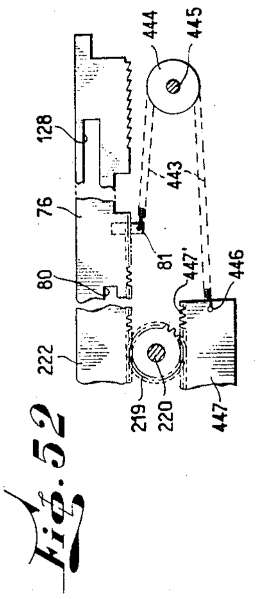
Figure 52 is a side elevation of a detail relative to the spring means of the transfer slides.

The tension of the springs 82 of the transfer slides 76 (see Figure 6) as well as the similar arrangement corresponding to the spring 165 of the function control transfer slide 159 (see Figure 16) is not uniform for each type of movement, since obviously the tension of said springs will decrease as the slides will be moved towards the stationary end of said springs. It may therefore be advisable to replace this spring arrangement by that suggested in Figure 52 in which a transfer slide 76 is shown with its corresponding boring 81, in which one end of a spring 443 of large length is housed and which spring passes over a roller 444 loosely mounted on shaft 445. The other end of spring 443 is anchored on a shaft 446 mounted between two inversor carriages 447 (only one visible) having racks 447' on the upper portions and which racks are meshing with the lower portion of gear 219 mounted on shaft 220 and which also meshes with carriages 222. It will thus be understood that as the carriages 222 move towards the rear end of the adding machines, the inversor carriages 447 move towards the front end of the machine and thereby the tension of the springs 443 is maintained uniform, so that the transfer slides 76 and its related elements will be better or more uniformly driven.

Instead of using the transmission system formed by gears 68 and 78 and shaft 169 (see Figure 6) or the similar arrangement (see Figure 16) it would be possible to use a shaft which swingably supports two levers connected to the respective racks and transfer slides in order to transmit the movement. This arrangement may be more suitable in those cases where the production of the racks implies certain difficulties.

Although the adding machine hereinafter described is a manually operated adding machine, nevertheless it is obvious that the main operating handle 22 may be replaced by an electric motor which directly operates the operating shaft 24, as is already known in the art.

If it is desired to provide an adding machine in accordance with the present invention for a system which is not a decimal system, such as for instance for pound sterling, it will only be necessary to modify the number of teeth of the totalizing gears and related parts, as will be apparent to anybody skilled in the art.

I claim:

1. In a full key board listing adding machine, having a front end and a rear end, a plurality of banks of numerical keys and a function control bank of keys, said plurality of banks of numerical keys being in functional relationship with a plurality of transfer slides, said functional relationship between each bank of numerical keys and its transfer slide consisting of an ordinal latching slide having a free front end portion, each numerical key having a key stem including a cam detent, pin members integral with said ordinal latching slide and alternately arranged on both sides of said ordinal latching slide in correspondency with said key stems likewise alternately arranged with regard to said ordinal latching slide, said cam detent being adapted to enter in clutching relationship with one of said pin members, a zero stop pawl having an upwardly extending branch in contact with and controlled by said free front end portion of said ordinal latching slide, a shaft, said zero stop pawl being swingably and loosely mounted on said shaft, said zero stop pawl having a hooked end, a rack slide arranged below said ordinal latching slide, and having a recess in its front end portion and a plurality of pin members alternately arranged on both sides of said rack slide and integral therewith, a rack defining the bottom edge of said rack slide, said hooked end of said zero stop pawl being adapted to enter said recess of said rack slide, thereby blocking it, said cam detents of any of said key stems being capable of sliding said ordinal latching slide towards the front end of the machine, thereby swinging said zero stop pawl about its shaft and withdrawing said hooked end from said recess, each rack slide comprising one pin member less than its corresponding ordinal latching slide, each rack slide having at least one elongated slot, a stationary supporting shaft passing through all of said elongated slots for guiding said rack slides and being adapted to enter in blocking contact with the rear end portion of said elongated slots, thereby replacing the pin member which corresponds to the extra pin member of the ordinal latching slide, a first gear meshing with said rack and mounted on a shaft supporting a second gear, said transfer slide having at its front bottom portion a rack, said second gear meshing with said rack of said transfer slide, an elongated slot in said transfer slide, said supporting shaft passing also through said last mentioned elongated slot, said rack of said transfer slide being located in the same horizontal plane as said rack of said rack slide, the latter being of smaller length than said transfer slide the rear portion of which enters the rear portion of the machine, a ratchet portion defining the bottom edge of said rear portion of said transfer slide and pawl blocking means for said ratchet portion, a plurality of parallelly arranged U-shaped totalizer operating racks, one for each transfer slide and elastically connected thereto, a cage comprising a pair of spaced apart frames, rods linking said frames, said plurality of U-shaped totalizer operating racks being slidably guided on said rods, a lever linkage controlled by said function control bank of keys for rectilinearly raising and lowering, substantially in the vertical plane, the entire cage and U-shaped totalizer operating racks therewith, a totalizing arrangement comprising a totalizing shaft, a plurality of totalizing gears loosely mounted on said totalizing shaft, one totalizing gear corresponding to each U-shaped totalizer operating rack including an upper rack and a lower rack facing each other, said upper and lower racks of each U-shaped totalizer operating rack being adapted to mesh said totalizing gears upon respectively lowering and raising said cage, tens transfer means connected to said totalizing arrangement, printing means connected to and operated by said plurality of transfer slides and driving means for operating said pawl blocking means and lever linkage.

2. In a full key board listing adding machine having a front end and a rear end and a plurality of banks of numerical keys and a function control bank of keys, said plurality of banks of numerical keys being in functional relationship with a plurality of transfer slides, said functional relationship between each bank of numerical keys and its transfer slide consisting of an ordinal latching slide having a free front end portion, each numerical key having a key stem including a cam detent, pin members integral with said ordinal latching slide and alternately arranged on both sides of said ordinal latching slide in correspondency with said key stems likewise alternately arranged with regard to said ordinal latching slide, said cam detent being adapted to enter in clutching relationship with one of said pin members, a zero stop pawl having an upwardly extending branch in contact with and controlled by said free front end portion of said ordinal latching slide, a shaft, said zero stop pawl being swingably and loosely mounted on said shaft, said zero stop pawl having a hooked end, a rack slide arranged below said ordinal latching slide, and having a recess in its front end portion and a plurality of pin members alternately arranged on both sides of said rack slide and integral therewith, a rack defining the bottom edge of said rack slide, said hooked end of said zero stop pawl being adapted to enter said recess of said rack slide, thereby blocking it, said cam detents of any of said key stems being capable of sliding said ordinal latching slide towards the front end of the machine, thereby swinging said zero stop pawl about its shaft and withdrawing said hooked end from said recess, each rack slide comprising one pin member less than its corresponding ordinal latching slide, each rack slide having at least one elongated slot, a stationary supporting shaft passing through all of said elongated slots for guiding said rack slides and being adapted to enter in blocking contact with the rear end portion of said elongated slots, thereby replacing the pin member which corresponds to the extra pin member of the ordinal latching slide, a first gear meshing with said rack and mounted on a shaft supporting a second gear, said transfer slide having at its front bottom portion a rack, said second gear meshing with said rack of said transfer slide, an elongated slot in said transfer slide, said supporting shaft passing also through said last mentioned elongated slot, said rack of said transfer slide being located in the same horizontal plane as said rack of said rack slide, the latter being of smaller length than said transfer slide the rear portion of which enters the rear portion of the machine and includes a ratchet portion defining the bottom edge of said rear portion of said transfer slide, and pawl blocking means for said ratchet portion controlled by a driving means, a plurality of parallelly arranged U-shaped totalizer operating racks, one for each transfer slide and elastically connected thereto, a cage comprising a pair of spaced apart frames, rods linking said frames, said plurality of U-shaped totalizer operating racks being slidably guided on said rods, a lever linkage controlled by said function control bank of keys for rectilinearly raising and lowering, substantially in the vertical plane, the entire cage and U-shaped totalizer operating racks therewith, a totalizing arrangement comprising a totalizing shaft, a plurality of totalizing gears loosely mounted on said totalizing shaft, one totalizing gear corresponding to each U-shaped totalizer operating rack including an upper rack and a lower rack facing each other, said upper and lower racks of each U-shaped totalizer operating rack being adapted to mesh said totalizing gears upon respectively lowering and raising said cage, tens transfer means connected to said totalizing arrangement, printing means connected to and operated by said plurality of pawl blocking means, said driving means including an operating shaft for operating said transfer slides and lever linkage, said function control bank of keys comprises a total key, a sub-total key, a non-adding key, a substraction key, a repetition key and a correction key, a function control latching slide, a function control zero stop pawl, a function control rack slide, a gear and shaft transmission, a function control transfer slide, each of said keys including a key stem, the key stems being alternately arranged on both sides of said function control latching slide in operative relationship with said function control rack slide operatively connected through said gear and shaft transmission to said function control transfer slide substantially identical with the arrangement of the ordinal latching slide, rack slide and transfer slide, with the exception that said function control rack slide comprises a larger recess for the hooked end of its stop pawl so that said function rack slide is capable of sliding a predetermined length, even if the stop pawl remains stationary in engaged position with said recess.

3. A full key board listing adding machine as claimed in claim 2, wherein each of said keys of said function control bank has a key stem including a cam detent, said key stems of the total key, subtotal key, repetition key and correction key each have a free end, a projecting pin mounted on each free end.

4. A full key board listing adding machine as claimed in claim 2, wherein said function control transfer slide has a rear end portion including a function control indicating column having a function indicating rack, a function indicating drum in said printing mechanism meshing with said function indicating rack, said rear end portion rigidly supporting said function control indicating column.

5. In a full key board listing adding machine having a front end and a rear end and a plurality of banks of numerical keys and a function control bank of keys, said plurality of banks of numerical keys being in functional relationship with a plurality of transfer slides said functional relationship between each bank of numerical keys and its transfer slide consisting of an ordinal latching slide having a free front end portion, each numerical key having a key stem including a cam detent, pin members integral with said ordinal latching slide and alternately arranged on both sides of said ordinal latching slide in correspondency with said key stems likewise alternately arranged with regard to said ordinal latching slide, said cam detent being adapted to enter in clutching relationship with one of said pin members, a zero stop pawl having an upwardly extending branch in contact with and controlled by said free front end portion of said ordinal latching slide, a shaft, said zero stop pawl being swingably and loosely mounted on said shaft, said zero stop pawl having a hooked end, a rack slide arranged below said ordinal latching slide, and having a recess in its front end portion and a plurality of pin members alternately arranged on both sides of said rack slide and integral therewith, a rack defining the bottom edge of said rack slide, said hooked end of said zero stop pawl being adapted to enter said recess of said rack slide, thereby blocking it, said cam detents of any of said key stems being capable of sliding said ordinal latching slide towards the front end of the machine, thereby swinging said zero stop pawl about its shaft and withdrawing said hooked end from said recess, each rack slide comprising one pin member less than its corresponding ordinal latching slide, each rack slide having at least one elongated slot, a stationary supporting shaft passing through all of said elongated slots for guiding said rack slides and being adapted to enter in blocking contact with the rear end portion of said elongated slots, thereby replacing the pin member which corresponds to the extra pin member of the ordinal latching slide, a first gear meshing with said rack and mounted on a shaft supporting a second gear, said transfer slide having at its front bottom portion a rack, said second gear meshing with said rack of said transfer slide, an elongated slot in said transfer slide, said supporting shaft passing also through said last mentioned elongated slot, said rack of said transfer slide being located in the same horizontal plane as said rack of said rack slide, the latter being of smaller length than said transfer slide the rear portion of which enters the rear portion of the machine, a ratchet portion defining the bottom edge of said rear portion of said transfer slide, and pawl blocking means for said ratchet portion controlled by a driving means, a plurality of parallelly arranged U-shaped totalizer operating racks, one for each transfer slide and elastically connected thereto, a cage comprising a pair of spaced apart frames, rods linking said frames, said plurality of U-shaped totalizer operating racks being slidably guided on said rods, a lever linkage controlled by said function control bank of keys for rectilinearly raising and lowering, substantially in the vertical plane, the entire cage and U-shaped totalizer operating racks therewith, a totalizing arrangement comprising a totalizing shaft, a plurality of totalizing gears loosely mounted on said totalizing shaft, one totalizing gear corresponding to each U-shaped totalizer operating rack including an upper rack and a lower rack facing each other, said upper and lower racks of each U-shaped totalizer operating rack being adapted to mesh said totalizing gears upon respectively lowering and raising said cage, tens transfer means connected to said totalizing arrangement, printing means connected to and operated by said plurality of pawl blocking means, said driving means including an operating shaft for operating said transfer slides and lever linkage, said function control bank of keys comprises a total key, a subtotal key, a non-adding key, a subtraction key, a repetition key and a correction key, a function control latching slide, a function control zero stop panel, a function control rack slide, a gear and shaft transmission, a function control transfer slide, each of said keys including a key stem, the key stems being alternately arranged on both sides of said function control latching slide in operative relationship with said function control rack slide operatively connected through said gear and shaft transmission to said function control transfer slide substantially identical with the arrangement of the ordinal latching slide, rack slide and transfer slide, with the exception that said function control rack slide comprises a larger recess for the hooked end of its stop pawl so that said function rack slide is capable of sliding predetermined length, even if the stop pawl remains stationary in engaged position with said recess, said lever linkage controlled by said function control bank of keys, including a function control indicating column, and at least one function control slide disengageably connected to said function control indicating column, said function control slide being capable of rectilinearly raising and lowering said cage substantially in the vertical plane.

6. In a full key board listing adding machine having a front end and a rear end, a plurality of banks of numerical keys and a function control bank of keys, said plurality of banks of numerical keys being in functional relationship with a plurality of transfer slides, corresponding one transfer slide to each bank of numerical keys, a plurality of parallelly arranged U-shaped totalizer operating racks, one for each transfer slide and elastically connected thereto, a cage comprising a pair of spaced apart frames arranged outside said plurality of U-shaped totalizer operating racks, a pair of spaced apart substantially superposed cage position determining rollers rotatably supported by each of said frames, rods linking said frames, said plurality of U-shaped totalizer operating racks being slidably guided on said rods, a pair of function control slides, each function control slide having a front rack, a gear meshing with each of said front racks and mounted on a common shaft, thereby assuring that both function control slides will be parallelly displaced, a totalizing arrangement comprising a single totalizing shaft, a plurality of totalizing gear loosely mounted on said single totalizing shaft, one totalizing gear corresponding to each U-shaped totalizer operating rack including an upper rack and a lower rack facing each other, said upper and lower racks of each U-shaped totalizer operating rack being adapted to mesh with its totalizing gear upon respectively rectilinearly lowering and raising said cage in the vertical plane, tens transfer means connected to said totalizing arrangement, each of said function control slides further having a slot, said single totalizing shaft passing through said slot, an intermediate totalizing gear meshing with each of said totalizing gears, an intermediate totalizer gear shaft supporting the intermediate totalizing gears, a totalizer gear meshing with each of said intermediate totalizing gears, said intermediate totalizer gear shaft passing also through said slot of said function control slide, said single totalizing shaft and said intermediate totalizer gear shaft guiding said function control slides in their longitudinal movement between said front end and said rear end of the machine, each function control slide further comprising a pair of upwardly projecting portions defining each a substantially horizontal upper edge divided into three theoretic portions consisting of a front portion corresponding to subtotal, a middle portion corresponding to total and a rear portion corresponding to subtraction, and further a pair of horizontal lower edges corresponding to the addition position connected to the substantial horizontal upper edges by respective first inclined plane portions, a pair of substantially intermediate horizontal edges connected to said pair of lower edges by second inclined plane portions, said intermediate horizontal edges corresponding to the neutral position, said pair of cage position determining rollers slidably resting on said edges to rectilinearly raise and lower said cage upon movement of said function control slides towards the rear end of the machine, to thereby successively meshing said U-shaped totalizer operating racks through their lower racks and upper racks with their totalizing gears and to take them out of mesh when said rollers are on the intermediate horizontal edges, said intermediate horizontal edges of said function control slides emerging into inclined plane end portions, rearwardly projecting ears connected to said inclined main end portions, disengaging arms having respective outwardly projecting plugs pivotally supported by said ears, said outwardly projecting plugs being controlled by said function control bank of keys, thereby determining the positions of said function control slides, printing means connected to and operated by said plurality of transfer slides and driving means for operating said transfer slides and said function control slides.

7. In a full key board listing adding machine having a front end and a rear end, a plurality of banks of numerical keys and a function control bank of keys, said plurality of banks of numerical keys being in functional relationship with a plurality of transfer slides, corresponding one transfer slide to each bank of numerical keys, a plurality of parallelly arranged U-shaped totalizer operating racks, one for each transfer slide and elastically connected thereto, a cage comprising a pair of spaced apart frames arranged outside said plurality of U-shaped totalizer operating racks, a pair of spaced apart substantially superposed cage position determining rollers rotatably supported by each of said frames, rods linking said frames, said plurality of U-shaped totalizer operating racks being slidably guided on said rods, a pair of function control slides, each function control slide having a front rack, a gear meshing with each of said front racks and mounted on a common shaft, thereby assuring that both function control slides will be parallelly displaced, a totalizing arrangement comprising a single totalizing shaft, a plurality of totalizing gears loosely mounted on said single totalizing shaft, one totalizing gear corresponding to each U-shaped totalizer operating rack including an upper rack and a lower rack facing each other, said upper and lower racks of each U-shaped totalizer operating rack being adapted to mesh with its totalizing gear upon respectively rectilinearly lowering and raising said cage in the vertical plane, tens transfer means connected to said totalizing arrangement, each of said function control slides further having a slot, said single totalizing shaft passing through said slot, an intermediate totalizing gear meshing with each of said totalizing gears, an intermediate totalizer gear shaft supporting the intermediate totalizing gears, a totalizer gear meshing with each of said intermediate totalizing gears, said intermediate totalizer gear shaft passing also through said slot of said function control slide, said single totalizing shaft and said intermediate totalizer gear shaft guiding said function control slides in their longitudinal movement between said front end and said rear end of the machine, each function control slide further comprising a pair of upwardly projecting portions defining each a substantially horizontal upper edge divided into three theoretic portions consisting of a front portion corresponding to subtotal, a middle portion corresponding to total and a rear portion corresponding to subtraction, and further a pair of horizontal lower edges corresponding to the addition position connected to the substantial horizontal upper edges by respective first inclined plane portions, a pair of substantially intermediate horizontal edges connected to said pair of lower edges by second inclined plane portions, said intermediate horizontal edges corresponding to the neutral position, said pair of cage position determining rollers slidably resting on said edges to rectilinearly raise and lower said cage upon movement of said function control slides towards the rear end of the machine, to thereby successively meshing said U-shaped totalizer operating racks through their lower racks and upper racks with their totalizing gears and to take them out of mesh when said rollers are on the intermediate horizontal edges, said intermediate horizontal edges of said function control slides emerging into inclined plane end portions, rearwardly projecting ears connected to said inclined main end portions, disengaging arms having respective first outwardly projecting plugs pivotally supported by said ears, a function control transfer slide, said function control bank of keys controlling slidable movement of said function control transfer slide from the front end towards the rear end of the machine, a control indicating column rigidly mounted on said function control transfer slide and including a second plug, said second plug of said control indicating column being adapted to enter in abutting contact with said first plug of said disengaging arm, so that when said control indicating column is moved towards the rear end of the machine it drags along said function control slide, printing means connected to and operated by said plurality of transfer slides, and driving means for operating said transfer slides and said function control slides.

8. In a full key board listing adding machine having a front end and a rear end, a plurality of banks of numerical keys and a function control bank of keys, said plurality of banks of numerical keys being in functional relationship with a plurality of transfer slides, corresponding one transfer slide to each bank of numerical keys, a plurality of parallelly arranged U-shaped totalizer operating racks, one for each transfer slide and elastically connected thereto, a cage comprising a pair of spaced apart frames arranged outside said plurality of U-shaped totalizer operating racks, a pair of spaced apart substantially superposed cage position determining rollers rotatably supported by each of said frames, rods linking said frames, said plurality of U-shaped totalizer operating racks being slidably guided on said rods, a pair of function control slides, each function control slide having a front rack, a gear meshing with each of said front racks and mounted on a common shaft, thereby assuring that both function control slides will be parallelly displaced, a totalizing arrangement comprising a single totalizing shaft, a plurality of totalizing gears loosely mounted on said single totalizing shaft, one totalizing gear corresponding to each U-shaped totalizer operating rack including an upper rack and a lower rack facing each other, said upper and lower rocks of each U-shaped totalizer operating rack being adapted to mesh with its totalizing gear upon respectively rectilinearly lowering and raising said cage in the vertical plane, tens transfer means connected to said totalizing arrangement, each of said function control slides further having a slot, said single totalizing shaft passing through said slot, an intermediate totalizing gear meshing with each of said totalizing gears, an intermediate totalizer gear shaft supporting the intermediate totalizing gears, a totalizer gear meshing with each of said intermediate totalizing gears, said intermediate totalizer gear shaft passing also through said slot of said function control slide, said single totalizing shaft and said intermediate totalizer gear shaft guiding said function control slides in their longitudinal movement between said front end and said rear end of the machine, each function control slide further comprising a pair of upwardly projecting portion defining each a substantially horizontal upper edge divided into three theoretic portions consisting of a front portion corresponding to subtotal, a middle portion corresponding to total and a rear portion corresponding to subtraction, and further a pair of horizontal lower edges corresponding to the addition position connected to the substantial horizontal upper edges by respective first inclined plane portions, a pair of substantially intermediate horizontal edges connected to said pair of lower edges by second inclined plane portions, said intermediate horizontal edges corresponding to the neutral position, said pair of cage position determining rollers slidably resting on said edges to rectilinearly raise and lower said cage upon movement of said function control slides towards the rear end of the machine, to thereby successively mesh with U-shaped totalizer operating racks through their lower racks and upper racks with their totalizing gears and to take them out of mesh when said rollers are on the intermediate horizontal edges, said intermediate horizontal edges of said function control slides emerging into inclined plane end portions, rearwardly projecting ears connected to said inclined main end portions, disengaging arms having respective first outwardly projecting plugs pivotally supported by said ears, a function control transfer slide controlled by said function control bank of keys, said function control transfer slide including a second plug, driving means comprising an operating shaft, an operating arm rigidly mounted on said operating shaft, a gear sector loosely mounted on said operating shaft and elastically connected to said operating arm, a pair of carriages adapted to be driven by said gear sector from the front end towards the rear end of the machine said carriages each having a rear end portion, a cam actuating pin integral with said rear end portions, a cam plate operable by said cam actuating pin, said cam plate being capable of swinging said disengaging arm of each of said function control slides, when said carriages are in their rear end positions, thereby disengaging said first plug of said disengaging arm from said second plug of said function control transfer slide and thereby disconnecting the function control slide from said function control transfer slide, said gear sector meshes with a gear mounted on a shaft supporting two further gears each meshing with one of said carriages, each carriage controlling said cam plate, each cam plate controlling one disengaging arm of the respective function control slides, printing means connected to and operated by said plurality of transfer slides, said driving means further operating said transfer slides.

9. A full key board listing adding machine as claimed in claim 8, wherein said operating shaft further supports a ratchet sector having a first cam surface and a second cam surface, a pawl meshing with said ratchet sector and disengageable therefrom by said first cam surface, and a pawl engaging lever adapted to engage said pawl when out of mesh with said ratchet sector, said second cam surface being adapted to disengage said pawl engaging lever from said pawl.

10. A full key board listing adding machine as claimed in claim 8, wherein said operating shaft further supports a double ratchet sector, an anchor adapted to mesh with either ratchet portions of said ratchet sector, said ratchet sector comprising a double cam adapted to control the position of said anchor.

11. In a full key board listing adding machine having a front end and a rear end, a plurality of banks of numerical keys and a function control bank of keys, said plurality of banks of numerical keys being in functional relationship with a plurality of transfer slides, a plurality of pawls for controlling said transfer slides, corresponding one transfer slide to each bank of numerical keys, a plurality of parallelly arranged U-shaped totalizer operating racks, one for each transfer slide and elastically connected thereto, a cage comprising a pair of spaced apart frames arranged outside said plurality of U-shaped totalizer operating racks, a pair of spaced apart substantially superposed cage position determining rollers rotatably supported by each of said frames, rods linking said frames, said plurality of U-shaped totalizer operating racks being slidably guided on said rods, a pair of function control slides, each function control slide having a front rack, a gear meshing with each of said front racks and mounted on a common shaft, thereby assuring that both function control slides will be parallelly displaced, a totalizing arrangement comprising a single totalizing shaft, a plurality of totalizing gears loosely mounted on said single totalizing shaft, one totalizing gear corresponding to each U-shaped totalizer operating rack including an upper rack and a lower rack facing each other, said upper and lower racks of each U-shaped totalizer operating rack being adapted to mesh with its totalizing gear upon respectively rectilinearly lowering and raising said cage in the vertical plane, tens transfer means connected to said totalizing arrangement, each of said function control slides further having a slot, said single totalizing shaft passing through said slot, an intermediate totalizing gear meshing with each of said totalizing gears, an intermediate totalizer gear shaft supporting the intermediate totalizing gears, a totalizer gear meshing with each of said intermediate totalizing gears, said intermediate totalizer gear shaft passing also through said slot of said function control slide, said single totalizing shaft and said intermediate totalizer gear shaft guiding said function control slides in their longitudinal movement between said front end and said rear end of the machine, each function control slide further comprising a pair of upwardly projecting portions defining each a substantially horizontal upper edge divided into three theoretic portions consisting of a front portion corresponding to subtotal, a middle portion corresponding to total and a rear portion corresponding to subtraction, and further a pair of horizontal lower edges corresponding to the addition position connected to the substantial horizontal upper edges by respective first inclined plane portions, a pair of substantially intermediate horizontal edges connected to said pair of lower edges by second inclined plane portions, said intermediate horizontal edges corresponding to the neutral position, said pair of cage position determining rollers slidably resting on said edges to rectilinearly raise and lower said cage upon movement of said function control slides towards the rear end of the machine, to thereby successively meshing said U-shaped totalizer operating racks through their lower racks and upper racks with their totalizing gears and to take them out of mesh when said rollers are on the intermediate horizontal edges, said intermediate horizontal edges of said function control slides emerging into inclined plane end portions, rearwardly projecting ears connected to said inclined main end portions, disengaging arms having respective outwardly projecting plugs pivotally supported by said ears, said outwardly projecting plugs being controlled by said function control bank of keys, thereby determining the positions of said function control slides, printing means connected to and operated by said plurality of transfer slides, and driving means including an operating shaft, a carriage, said carriage having a projecting nose, an L-shaped lever having a substantially vertical and a substantially horizontal arm, the free end of said vertical arm being in functional relationship with said nose, said horizontal arm being provided with a first blocking projection and a second blocking projection, a cam mounted on said operating shaft, said cam having an increasing cam surface, a constant maximum cam surface, an instantaneous decreasing cam surface and a constant minimum cam surface, a lever having a cam follower operated by said cam to progressively rotate said lever in clockwise direction until reaching the constant maximum cam surface and instantaneously return said lever to its start position when reaching the instantaneous decreasing cam surface, a commanding plate controlled by said lever and having a stop shaft for returning said first tens transfer means to start position, said commanding plate further including a rear end portion for operating said pawls controlling said transfer levers, and a window in said commanding plate, a totalizing comb centering commanding plate parallelly arranged to said commanding plate and having a projecting pin entering said window of said commanding plate and a lower recess adapted to enter in blocking relationship with said first blocking projection of said L-shaped lever, a totalizing comb plate integral with said totalizing centering commanding plate, said totalizing comb plate being adapted to mesh with said plurality of totalizing gears, a subtotal and total stop comb slidably mounted on said totalizing comb centering plate, a subtotal and total stop comb commanding lever for controlling said totalizing comb centering plate through one of its ends, whilst the other end is controlled by said substantially horizontal intermediate edge and said rear inclined portion of said function control slide, said second blocking projection of said L-shaped lever being adapted to block said function control slide when in subtotal position.

12. A full key board listing adding machine as claimed in claim 3, and further comprising a commanding lever, a pivotal shaft for said commanding lever dividing said commanding lever into two sides, said projecting pins of said total and subtotal keys adapted to enter in driving contact with said commanding lever at one side of its pivotal shaft, an upwardly projecting commanding arm integral with the other side of said commanding lever, a bell crank lever having a horizontal arm, an oblique arm, a vertical arm and a declutching projecting arm, said bell crank lever being controlled by said commanding arm, a control lever connected to said horizontal arm and said vertical arm having an ordinal latching slide disengaging shaft adapted to enter in pushing contact with said ordinal latching slides for pushing them towards the front end of the machine, thereby disengaging the cam detent of depressed key stems, said commanding lever being connected to said control lever so that upon depressing said total or subtotal key, said upwardly projecting commanding arm will counter clockwise oscillate said bell crank lever, said correction key projecting pin being in driving relationship with said oblique arm of said bell crank lever, said control lever being further connected to said operating shaft through a pawl arrangement, so that during the return rotary movement of the operating shaft, said control lever will operate said bell crank lever, a repetition disengaging bell crank lever in operative relationship with said control lever and defining the fulcrum thereof, a repetition lever, said repetition key controlling said repetition disengaging bell crank lever through said repetition lever, said declutching projecting arm controlling a clutching lever for clutching said ordinal latching slides, each of which has a pair of adjacent recesses into which a clutching end of said clutching lever is capable of penetrating upon movement towards the rear end of the carriage, which latter is in functional relationship with said clutching lever, said control lever comprising a front end portion, a rear end portion, a fulcrum pin between said front end portion and said rear end portion a slot in said front end portion, said horizontal arm of said bell crank lever having a pin projecting into said slot, said rear end portion of said control lever comprising an upwardly extending slotted guide, said operating shaft passing through said slotted guide, a key board disengaging cam, said rear end portion of said control lever further comprising a downwardly projecting ear, a bell crank lever pivotally mounted on said downwardly projecting ear and in functional relationship with said keyboard disengaging cam, so that the latter may freely rotate in clockwise direction and will swing said control lever about its fulcrum when rotating in counterclockwise rotation, thereby operating said bell crank lever and said ordinal latching slide disengaging shaft, said repetition disengaging bell crank lever comprising a substantially vertical arm having an upper end portion, said fulcrum pin of said control lever resting on said upper end portion of said last mentioned vertical arm, a stationary pivot, said repetition disengaging bell crank lever being pivotally mounted on said stationary pivot, said repetition disengaging bell crank lever further comprising a substantially horizontal arm, pivotally linked to said repetition lever, so that upon depressing said repetition key, said vertical arm of said repetition disengaging bell crank lever is withdrawn from under said fulcrum pin of said control lever.

References Cited in the file of this patent

UNITED STATES PATENTS

| | | |
|---|---|---|
| 895,664 | McFarland | Aug. 11, 1908 |
| 1,195,567 | Draughon | Aug. 22, 1916 |
| 1,286,769 | Quentell | Dec. 3, 1918 |
| 1,293,544 | Quentell | Feb. 4, 1919 |
| 1,318,397 | Malcher | Oct. 14, 1919 |
| 1,371,138 | Bair | Mar. 8, 1921 |
| 2,176,640 | Payne | Oct. 17, 1939 |
| 2,226,919 | Gubelmann | Dec. 31, 1940 |
| 2,360,005 | Mehan | Oct. 10, 1944 |
| 2,542,658 | Garbell | Feb. 20, 1951 |
| 2,753,111 | Tancred | July 3, 1956 |

FOREIGN PATENTS

| | | |
|---|---|---|
| 242,094 | Germany | Dec. 21, 1911 |
| 660,638 | Great Britain | Nov. 7, 1951 |